(12) United States Patent
Piper et al.

(10) Patent No.: US 8,650,741 B1
(45) Date of Patent: Feb. 18, 2014

(54) METHOD OF ASSEMBLING UNIVERSAL GATE

(75) Inventors: Krystal J. Piper, Bulls Gap, TN (US); Robert Sonnabend, Middleburg Heights, OH (US)

(73) Assignee: Barrette Outdoor Living, Inc., Middleburg Heights, OH (US)

( * ) Notice: Subject to any disclaimer, the term of this patent is extended or adjusted under 35 U.S.C. 154(b) by 113 days.

(21) Appl. No.: 13/159,065

(22) Filed: Jun. 13, 2011

Related U.S. Application Data

(62) Division of application No. 12/044,445, filed on Mar. 7, 2008, now abandoned.

(51) Int. Cl.
- *B21D 39/00* (2006.01)
- *E04H 17/14* (2006.01)
- *E04H 17/16* (2006.01)

(52) U.S. Cl.
USPC ....... 29/525.01; 403/171; 256/59; 256/65.01; 256/65.02; 256/66; 256/73

(58) Field of Classification Search
USPC .................. 29/525.01, 525.13; 403/171, 172; 256/59, 65.01, 65.02, 65.1, 66, 73
See application file for complete search history.

(56) References Cited

U.S. PATENT DOCUMENTS

| | | |
|---|---|---|
| 249,066 A | 11/1881 | Martin |
| 2,863,682 A | 12/1958 | Canepa |
| 3,021,159 A | 2/1962 | Back |
| 3,633,250 A | 1/1972 | Romney |
| 4,161,375 A | 7/1979 | Murphy |
| 4,397,448 A | 8/1983 | Dillon |
| 4,915,535 A | 4/1990 | Willetts |
| 5,161,783 A | 11/1992 | German |
| 5,169,258 A | 12/1992 | Raynak |
| 6,010,117 A | 1/2000 | Doxey |
| D427,322 S | 6/2000 | DeSouza |
| 6,131,888 A | 10/2000 | Brown |
| 6,290,214 B1 | 9/2001 | DeSouza |
| 6,398,193 B1 | 6/2002 | DeSouza |
| 6,446,938 B1 | 9/2002 | Hadfield, Sr. |
| 6,478,287 B2 | 11/2002 | DeSouza |
| 6,752,438 B2 | 6/2004 | DeSouza |
| 6,896,437 B2 | 5/2005 | Morgan |
| 7,883,288 B2 | 2/2011 | Jorna |
| D670,405 S | 11/2012 | McKenzie |
| 2004/0041142 A1 | 3/2004 | Morgan |
| 2009/0226246 A1 | 9/2009 | Piper et al. |

FOREIGN PATENT DOCUMENTS

| | | |
|---|---|---|
| CA | 2157155 | 11/2000 |
| CA | 2349963 | 12/2001 |
| CA | 2362250 | 5/2002 |
| CA | 2298963 | 1/2004 |
| CA | 2653263 | 9/2009 |
| GB | 927652 | 5/1963 |
| GB | 2213193 | 8/1989 |

*Primary Examiner* — Jermie Cozart
(74) *Attorney, Agent, or Firm* — Luedeka Neely Group, PC

(57) ABSTRACT

Various embodiments of an invention regarding universal fence gates are described including a specially shaped fence gate connector that may act as an elbow and/or a T-member, a universal fence gate kit with parts for assembling a universal fence gate including a specially shaped fence gate connector, a universal fence gate assembled using a specially shaped fence gate connector, and methods for assembling fence gates using a uniquely shaped fence gate connector.

3 Claims, 32 Drawing Sheets

FIG. 12A

| 602 | attaching the third flange 130 of the first connector 102 and the fourth flange 132 of the first connector 102 to the first end 134 of the first beam 110 |
|---|---|
| 604 | attaching the third flange 136 of the fourth connector 108 and the fourth flange 138 of the fourth connector 108 to the second end 140 of the first beam 110 |
| 606 | attaching the third flange 142 of the second connector 104 and the fourth flange 144 of the second connector 104 to the first end 146 of the second beam 112 |
| 608 | attaching the third flange 148 of the third connector 106 and the fourth flange 150 of the third connector 106 to the second end 152 of the second beam 112 |
| 610 | attaching the first flange 154 of the first connector 102 and the second flange 156 of the first connector 102 to the first end 158 of the first rail 160 of fence panel 128 |
| 612 | attaching the first flange 162 of the fourth connector 108 and the second flange 164 of the fourth connector 108 to the first end 166 of the second rail 168 of fence panel 128 |
| 614 | attaching the first flange 170 of the second connector 104 and the second flange 172 of the second connector 104 to the second end 174 of the first rail 160 of fence panel 128 |
| 616 | attaching the first flange 176 of the third connector 106 and the second flange 178 of the third connector 106 to the second end 180 of the second rail 168 of fence panel 128 |

FIG. 12B

| 601 | adjusting the size of the fence panel |
|---|---|
| 602 | attaching the third flange 130 of the first connector 102 and the fourth flange 132 of the first connector 102 to the first end 134 of the first beam 110 |
| 604 | attaching the third flange 136 of the fourth connector 108 and the fourth flange 138 of the fourth connector 108 to the second end 140 of the first beam 110 |
| 606 | attaching the third flange 142 of the second connector 104 and the fourth flange 144 of the second connector 104 to the first end 146 of the second beam 112 |
| 608 | attaching the third flange 148 of the third connector 106 and the fourth flange 150 of the third connector 106 to the second end 152 of the second beam 112 |
| 610 | attaching the first flange 154 of the first connector 102 and the second flange 156 of the first connector 102 to the first end 158 of the first rail 160 of fence panel 128 |
| 612 | attaching the first flange 162 of the fourth connector 108 and the second flange 164 of the fourth connector 108 to the first end 166 of the second rail 168 of fence panel 128 |
| 614 | attaching the first flange 170 of the second connector 104 and the second flange 172 of the second connector 104 to the second end 174 of the first rail 160 of fence panel 128 |
| 616 | attaching the first flange 176 of the third connector 106 and the second flange 178 of the third connector 106 to the second end 180 of the second rail 168 of fence panel 128 |

FIG. 12C

| | |
|---|---|
| 601A | adjusting the size of the fence panel |
| 601B | adjusting the length of the first beams |
| 601C | adjusting the length of the second beams |
| 602 | attaching the third flange 130 of the first connector 102 and the fourth flange 132 of the first connector 102 to the first end 134 of the first beam 110 |
| 604 | attaching the third flange 136 of the fourth connector 108 and the fourth flange 138 of the fourth connector 108 to the second end 140 of the first beam 110 |
| 606 | attaching the third flange 142 of the second connector 104 and the fourth flange 144 of the second connector 104 to the first end 146 of the second beam 112 |
| 608 | attaching the third flange 148 of the third connector 106 and the fourth flange 150 of the third connector 106 to the second end 152 of the second beam 112 |
| 610 | attaching the first flange 154 of the first connector 102 and the second flange 156 of the first connector 102 to the first end 158 of the first rail 160 of fence panel 128 |
| 612 | attaching the first flange 162 of the fourth connector 108 and the second flange 164 of the fourth connector 108 to the first end 166 of the second rail 168 of fence panel 128 |
| 614 | attaching the first flange 170 of the second connector 104 and the second flange 172 of the second connector 104 to the second end 174 of the first rail 160 of fence panel 128 |
| 616 | attaching the first flange 176 of the third connector 106 and the second flange 178 of the third connector 106 to the second end 180 of the second rail 168 of fence panel 128 |

FIG. 12D

| | |
|---|---|
| 602 | attaching the third flange 130 of the first connector 102 and the fourth flange 132 of the first connector 102 to the first end 134 of the first beam 110 |
| 604 | attaching the third flange 136 of the fourth connector 108 and the fourth flange 138 of the fourth connector 108 to the second end 140 of the first beam 110 |
| 606 | attaching the third flange 142 of the second connector 104 and the fourth flange 144 of the second connector 104 to the first end 146 of the second beam 112 |
| 608 | attaching the third flange 148 of the third connector 106 and the fourth flange 150 of the third connector 106 to the second end 152 of the second beam 112 |
| 610 | attaching the first flange 154 of the first connector 102 and the second flange 156 of the first connector 102 to the first end 158 of the first rail 160 of fence panel 128 |
| 612 | attaching the first flange 162 of the fourth connector 108 and the second flange 164 of the fourth connector 108 to the first end 166 of the second rail 168 of fence panel 128 |
| 614 | attaching the first flange 170 of the second connector 104 and the second flange 172 of the second connector 104 to the second end 174 of the first rail 160 of fence panel 128 |
| 616 | attaching the first flange 176 of the third connector 106 and the second flange 178 of the third connector 106 to the second end 180 of the second rail 168 of fence panel 128 |
| 618 | attaching the extensions 194 to the third beams 182 |
| 620 | attaching the extensions 196 to the fourth beams 188 |

FIG. 12E

| | |
|---|---|
| 602 | attaching the third flange 130 of the first connector 102 and the fourth flange 132 of the first connector 102 to the first end 134 of the first beam 110 |
| 604 | attaching the third flange 136 of the fourth connector 108 and the fourth flange 138 of the fourth connector 108 to the second end 140 of the first beam 110 |
| 606 | attaching the third flange 142 of the second connector 104 and the fourth flange 144 of the second connector 104 to the first end 146 of the second beam 112 |
| 608 | attaching the third flange 148 of the third connector 106 and the fourth flange 150 of the third connector 106 to the second end 152 of the second beam 112 |
| 610 | attaching the first flange 154 of the first connector 102 and the second flange 156 of the first connector 102 to the first end 158 of the first rail 160 of fence panel 128 |
| 612 | attaching the first flange 162 of the fourth connector 108 and the second flange 164 of the fourth connector 108 to the first end 166 of the second rail 168 of fence panel 128 |
| 614 | attaching the first flange 170 of the second connector 104 and the second flange 172 of the second connector 104 to the second end 174 of the first rail 160 of fence panel 128 |
| 616 | attaching the first flange 176 of the third connector 106 and the second flange 178 of the third connector 106 to the second end 180 of the second rail 168 of fence panel 128 |
| 617A | adjusting the length of the third beams 182 |
| 617B | adjusting the length of the fourth beams 188 |
| 618 | attaching the extensions 194 to the third beams 182 |
| 620 | attaching the extensions 196 to the fourth beams 188 |

METHOD OF ASSEMBLING UNIVERSAL GATE

This application is a divisional application that claims priority to pending U.S. application Ser. No. 12/044,445 entitled "Universal Gate Kit and Method of Assembling Universal Gate" to Krystal J. Piper et al. filed on Mar. 7, 2008, the entirety of which is incorporated herein by reference.

FIELD

This invention relates to the field of fence gate structures. More particularly, this invention relates to a universal gate kit for assembling a fence gate.

BACKGROUND

Gated fences have been used for centuries, but the manufacturing and use of pre-fabricated gate fences specifically tailored for a particular fence style or styles is a relatively recent phenomenon. This is particularly true for fences made of polyvinyl chloride (PVC) materials. Such fences are made from interchangeable PVC fence parts that form fence panels. This interchangeability of fence parts of specific styles of PVC and other related fencing structures allows wholesalers and retailers to stock significantly fewer fence parts than if such parts were not interchangeable.

However, fence wholesalers and retailers generally must keep on hand a broad selection of fence gates. This is true because every fence installation is different and requires different sized gates (both from a width standpoint and a height standpoint). Because of the uncertainty of the needs of consumers in any given fence installation situation, wholesalers, retailers and other related businesses stock a myriad of shapes and sizes of fence gates. This practice is wasteful and not economically efficient because of the uncertainty of whether certain fence gates will be sold or used at all.

Another concern for contractors and other persons who are responsible for ultimately building various fences and fence gates is the time and effort required to construct such fences and related fence structures.

What is needed, therefore, is a simple structure and/or kit that allows for the construction of a fence gate in a variety of fence styles and fence shapes using simple and efficient steps to construct the fence gate and using interchangeable and easily adjustable materials.

SUMMARY

The above and other needs are met by a special connector used in assembling gate components to form a fence gate. The connector includes the following: (1) a hub substantially centered on an intersection of an imaginary X-axis and an imaginary Y-axis, wherein the X-axis and the Y-axis are mutually orthogonal; (2) a first flange that extends from the hub in a direction that is substantially perpendicular to the Y-axis and at an angle $\theta_1$ to the X-axis when the first flange is not engaged with a gate component, wherein the angle $\theta_1$ ranges from greater than 0 degrees to about 20 degrees; (3) a second flange that extends from the hub in a direction that is substantially perpendicular to the Y-axis and at an angle $\theta_2$ to the X-axis when the second flange is not engaged with a gate component, wherein the angle $\theta_2$ ranges from less than 0 degrees to about −20 degrees; (4) a third flange that extends from the hub in a direction that is substantially perpendicular to the X-axis and at an angle $\phi_1$ to the Y-axis when the third flange is not engaged with a gate component, wherein the angle $\phi_1$ ranges from greater than 0 degrees to about 20 degrees; and (5) a fourth flange that extends from the hub in a direction that is substantially perpendicular to the X-axis and at an angle $\phi_2$ to the Y-axis when the fourth flange is not engaged with a gate component, wherein the angle $\phi_2$ ranges from less than 0 degrees to about −20 degrees. In a preferred embodiment, the connector also includes an extension for attaching a beam or other fence structure to the connector, wherein the extension extends from the hub in a direction that is substantially parallel to the Y-axis, and the extension is disposed on an opposite side of the hub from the third flange and the fourth flange.

Another embodiment of the invention includes a kit of components used in assembling a fence gate. In one embodiment, the kit includes the following: (1) a first connector and a second connector, each comprising (i) a hub substantially centered on an intersection of an imaginary X-axis and an imaginary Y-axis, wherein the X-axis and the Y-axis are mutually orthogonal; (ii) a flexible first flange that extends from the hub in a direction that is substantially perpendicular to the Y-axis and at an angle $\theta_1$ to the X-axis when the first flange is not engaged with a gate component, wherein the angle $\theta_1$ ranges from greater than 0 degrees to about 20 degrees; (iii) a flexible second flange that extends from the hub in a direction that is substantially perpendicular to the Y-axis and at an angle $\theta_2$ to the X-axis when the second flange is not engaged with a gate component, wherein the angle $\theta_2$ ranges from less than 0 degrees to about −20 degrees; (iv) a flexible third flange that extends from the hub in a direction that is substantially perpendicular to the X-axis and at an angle $\phi_1$ to the Y-axis when the third flange is not engaged with a gate component, wherein the angle $\phi_1$ ranges from greater than 0 degrees to about 20 degrees; and (v) a flexible fourth flange that extends from the hub in a direction that is substantially perpendicular to the X-axis and at an angle $\phi_2$ to the Y-axis when the fourth flange is not engaged with a gate component, wherein the angle $\phi_2$ ranges from less than 0 degrees to about −20 degrees. In a related embodiment the kit further comprises (2) a third connector and a fourth connector, each comprising (i) a hub substantially centered on an intersection of an imaginary X-axis and an imaginary Y-axis, wherein the X-axis and the Y-axis are mutually orthogonal; (ii) a flexible first flange that extends from the hub in a direction that is substantially perpendicular to the Y-axis and at an angle $\theta_1$ to the X-axis when the first flange is not engaged with a gate component, wherein the angle $\theta_1$ ranges from greater than 0 degrees to about 20 degrees; (iii) a flexible second flange that extends from the hub in a direction that is substantially perpendicular to the Y-axis and at an angle $\theta_2$ to the X-axis when the second flange is not engaged with a gate component, wherein the angle $\theta_2$ ranges from less than 0 degrees to about −20 degrees; (iv) a flexible third flange that extends from the hub in a direction that is substantially perpendicular to the X-axis and at an angle $\phi_1$ to the Y-axis when the third flange is not engaged with a gate component, wherein the angle $\phi_2$ ranges from greater than 0 degrees to about 20 degrees; and (v) a flexible fourth flange that extends from the hub in a direction that is substantially perpendicular to the X-axis and at an angle $\phi_2$ to the Y-axis when the fourth flange is not engaged with a gate component, wherein the angle $\phi_1$ ranges from less than 0 degrees to about −20 degrees; wherein the first and second flanges of the third connector and the first and second flanges of the fourth connector are operable to engage with a fence panel disposed substantially between the first and second elongate beams; and wherein the third and fourth flanges of the third connector are operable to engage with the second end of the second beam and wherein the third and fourth flanges of the fourth connector are operable to engage with the second end of the first beam. In an alternative embodiment, the kit further comprises (2) a third connector and a fourth connector, each comprising (i) a hub substantially centered on an intersection of an imaginary X-axis and an imaginary Y-axis, wherein the X-axis and the Y-axis are mutually orthogonal; (ii) a projection that extends from the hub in a direction that is substantially perpendicular to the Y-axis; (iii) a flexible third flange that extends from the hub in a direction that is substantially perpendicular to the X-axis and at an angle $\phi_1$ to the Y-axis when the third flange is not engaged with a gate component, wherein the angle $\phi_1$ ranges from greater than 0 degrees to about 20 degrees; and (iv) a flexible fourth flange that extends from the hub in a direction that is substantially perpendicular to the X-axis and at an angle $\phi_2$ to the Y-axis when the fourth flange is not engaged with a gate component, wherein the angle $\phi_2$ ranges from less than 0 degrees to about –20 degrees; wherein the projection of the third connector and the projection of the fourth connector are operable to engage with a fence panel disposed substantially between the first and second elongate beams; and wherein the third and fourth flanges of the third connector are operable to engage with the second end of the second beam and wherein the third and fourth flanges of the fourth connector are operable to engage with the second end of the first beam.

In yet another embodiment, the invention includes a fence gate assembled using the components of various embodiments of the kit described above. In one embodiment, the fence gate includes (1) a first connector and a second connector, each comprising (i) a hub substantially centered on an intersection of an imaginary X-axis and an imaginary Y-axis, wherein the X-axis and the Y-axis are mutually orthogonal; (ii) a first flange that extends from the hub in a direction that is substantially perpendicular to the Y-axis and at an angle $\theta_1$ to the X-axis when the first flange is not engaged with a gate component, wherein the angle $\theta_1$ ranges from greater than 0 degrees to about 20 degrees; (iii) a second flange that extends from the hub in a direction that is substantially perpendicular to the Y-axis and at an angle $\theta_2$ to the X-axis when the second flange is not engaged with a gate component, wherein the angle $\theta_2$ ranges from less than 0 degrees to about –20 degrees; (iv) a third flange that extends from the hub in a direction that is substantially perpendicular to the X-axis and at an angle $\phi_1$ to the Y-axis when the third flange is not engaged with a gate component, wherein the angle $\phi_1$ ranges from greater than 0 degrees to about 20 degrees; and (v) a fourth flange that extends from the hub in a direction that is substantially perpendicular to the X-axis and at an angle $\phi_2$ to the Y-axis when the fourth flange is not engaged with a gate component, wherein the angle $\phi_2$ ranges from less than 0 degrees to about –20 degrees; (2) a third connector and a fourth connector, each comprising (i) a hub substantially centered on an intersection of an imaginary X-axis and an imaginary Y-axis, wherein the X-axis and the Y-axis are mutually orthogonal; (ii) a third flange that extends from the hub in a direction that is substantially perpendicular to the X-axis and at an angle $\phi_1$ to the Y-axis when the third flange is not engaged with a gate component, wherein the angle $\phi_1$ ranges from greater than 0 degrees to about 20 degrees; and (iii) a fourth flange that extends from the hub in a direction that is substantially perpendicular to the X-axis and at an angle $\phi_2$ to the Y-axis when the fourth flange is not engaged with a gate component, wherein the angle $\phi_2$ ranges from less than 0 degrees to about –20 degrees; (3) a fence panel including a first rail and a second rail, the first rail having opposing first and second end openings, wherein the first end opening of the first rail is engaged with the first and second flanges of the first connector and the second end opening of the first rail is engaged with the first and second flanges of the second connector, the second rail having opposing first and second end openings, wherein the first end opening of the second rail is engaged with the third connector and the second end opening of the second rail is engaged with the fourth connector; (4) a first elongate beam having opposing first and second end openings, the first end opening of the first elongate beam for engaging with the third and fourth flanges of the first connector, and the second end opening of the first elongate beam for engaging with the third and fourth flanges of the fourth connector; and (5) a second elongate beam having opposing first and second end openings, the first end opening of the second elongate beam for engaging with the third and fourth flanges of the second connector, and the second end opening of the second elongate beam for engaging with the third and fourth flanges of the third connector.

In a related embodiment, the fence panel described above includes a first rail and a second rail, the first rail having opposing first and second end openings, wherein the first end opening of the first rail is engaged with the first and second flanges of the first connector and the second end opening of the first rail is engaged with the first and second flanges of the second connector, the second rail having opposing first and second end openings, wherein the first end opening of the second rail is engaged with the first and second flanges of the third connector and the second end opening of the second rail is engaged with the first and second flanges of the fourth connector.

Certain embodiments of the invention include methods for assembling a fence gate as described above including the steps of (1) attaching the third and fourth flanges of the first connector to the first end opening of the first elongate beam; (2) attaching the third and fourth flanges of the fourth connector to the second end opening of the first elongate beam; (3) attaching the third and fourth flanges of the second connector to the first end opening of the second elongate beam; (4) attaching the third and fourth flanges of the third connector to the second end opening of the second elongate beam; (5) attaching the first and second flanges of the first connector to the first end opening of the first rail; (6) attaching the first and second flanges of the second connector to the second end opening of the first rail; (7) attaching the first and second flanges of the fourth connector to the first end opening of the second rail; and (8) attaching the first and second flanges of the third connector to the second end opening of the second rail. In a related embodiment, the method also includes the steps of (1) adjusting the size of the fence panel, (2) adjusting the length of the first beam, and (3) adjusting the length of the second beam.

Other embodiments of connectors are described herein including a modified connector in which the first flange extends from the hub in a direction that is substantially perpendicular to the Y-axis, the first flange further including a base flange that is oriented substantially toward the second flange. Similarly, the second flange extends from the hub in a direction that is substantially perpendicular to the Y-axis, the second flange further including a base flange that is oriented substantially toward the first flange. This embodiment also includes a first cross flange attached to and extending between the third flange and the fourth flange and a second cross flange attached to and extending between the third flange and the fourth flange, thereby forming a receptacle for receiving a beam. This embodiment of a connector is different from the previous embodiments described in that an end of a rail is preferably inserted substantially between the first flange and the second flange for attachment to assemble a fence gate.

Similarly, an end of a beam is preferably inserted into the receptacle of the connector during attachment.

In a related embodiment, a connector is provided that includes a first cross flange attached to and extending between the third flange and the fourth flange; a second cross flange attached to and extending between the third flange and the fourth flange, thereby forming a receptacle for receiving a beam; a third cross flange attached to and extending between the first flange and the second flange; and a fourth cross flange attached to and extending between the first flange and the second flange, thereby forming a receptacle for receiving a rail. This embodiment of a connector is different from the previous embodiments described in that an end of a rail is preferably inserted into the receptacle formed between the first flange and the second flange to be attached to the connector. Similarly, an end of a beam is preferably inserted into the receptacle formed between the third flange and the fourth flange to be attached to the connector.

BRIEF DESCRIPTION OF THE DRAWINGS

These and other features, aspects, and advantages of the present invention will become more apparent by reference to the detailed description and appended claims in conjunction with the figures, wherein elements are not to scale so as to more clearly show the details, wherein like reference numbers indicate like elements throughout the several views, and wherein:

FIG. 12A shows steps of a method for assembling a fence gate;

FIG. 12B shows steps of a method for assembling a fence gate;

FIG. 12C shows steps of a method for assembling a fence gate;

FIG. 12D shows steps of a method for assembling a fence gate;

FIG. 12E shows steps of a method for assembling a fence gate;

DETAILED DESCRIPTION

Figure 1A:
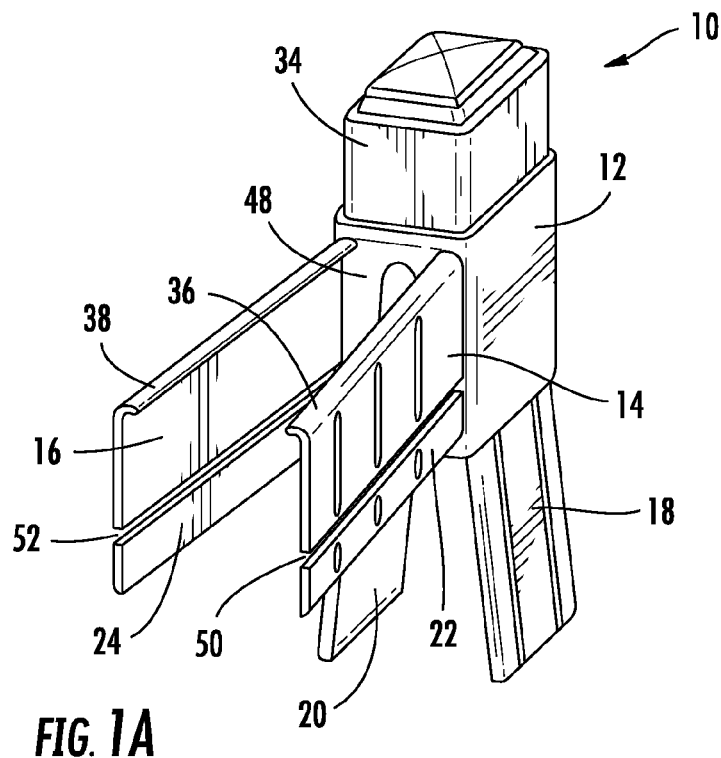
FIG. 1A shows a perspective view of a connector for a fence gate.
Figure 1B:
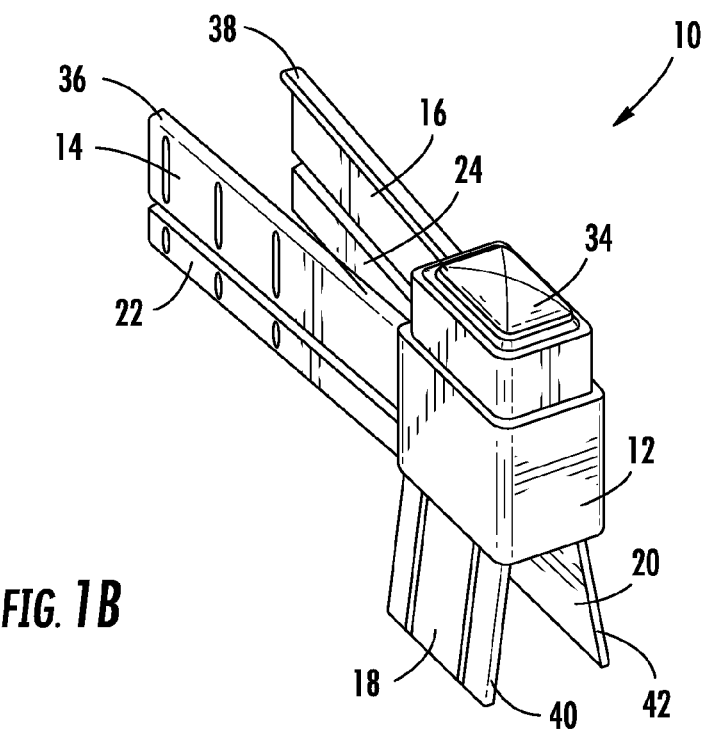
FIG. 1B shows a perspective view of a connector for a fence gate.
Figure 1C:
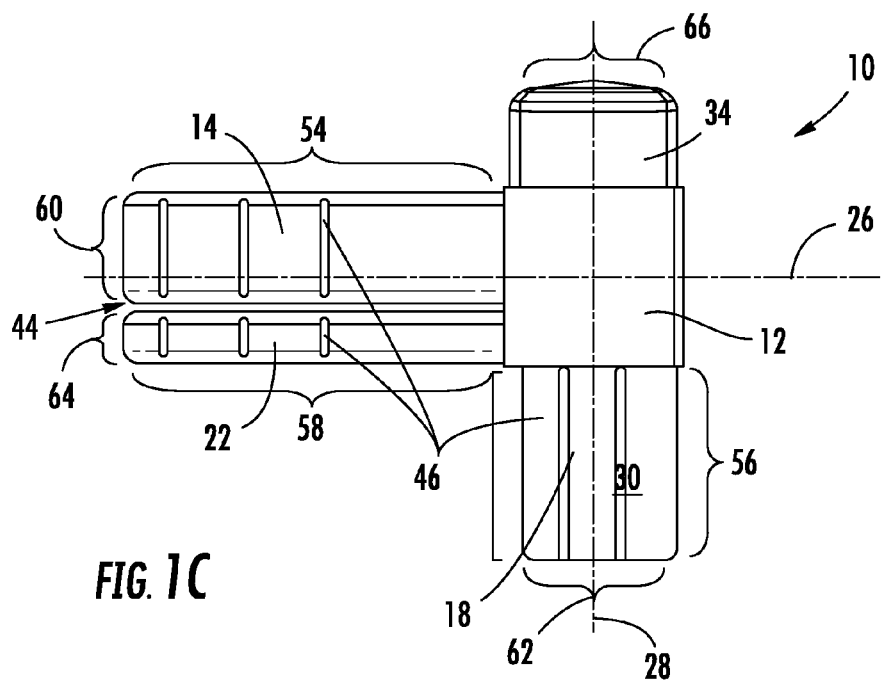
FIG. 1C shows a side view of a connector for a fence gate.

FIGS. 1A, 1B, 1C, 1D, 1E show a preferred embodiment of a connector 10 for assembling parts of a fence gate into a single structure. The connector 10 may be further defined structurally as including a hub 12, a first flange 14, a second flange 16, a third flange 18, a fourth flange 20, a fifth flange 22, and a sixth flange 24. To provide a frame of reference for describing the connector 10, the hub 12 can be thought of as oriented on an imaginary plane that is defined by an X-axis 26 and a Y-axis 28 as shown in FIG. 1C. The first flange 14, the second flange 16, the fifth flange 22, and the sixth flange 24 extend from the hub 12 substantially perpendicular to the Y-axis 28. The third flange 18 and the fourth flange 20 extend from the hub 12 substantially perpendicular to the X-axis 26. The arrangement of flanges (14, 16, 18, 20, 22, and 24) is such that the connector 10 acts as an "elbow joint" for the frame of a fence gate structure. The first flange 14, the second flange 16, the fifth flange 22, and the sixth flange 24 are preferably used for attachment to a fence panel such as fence panel 128 shown in FIG. 2A. The third flange 18 and the fourth flange 20 are preferably used for attachment to an elongate beam that acts as a vertical frame member for a completed fence gate structure. An example of such a beam is first beam 110 shown in FIG. 2A.

Figure 1D:
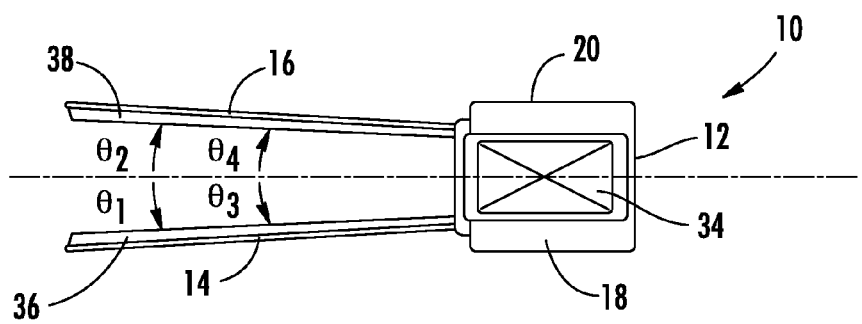
FIG. 1D shows a top view of a connector for a fence gate.
Figure 1E:
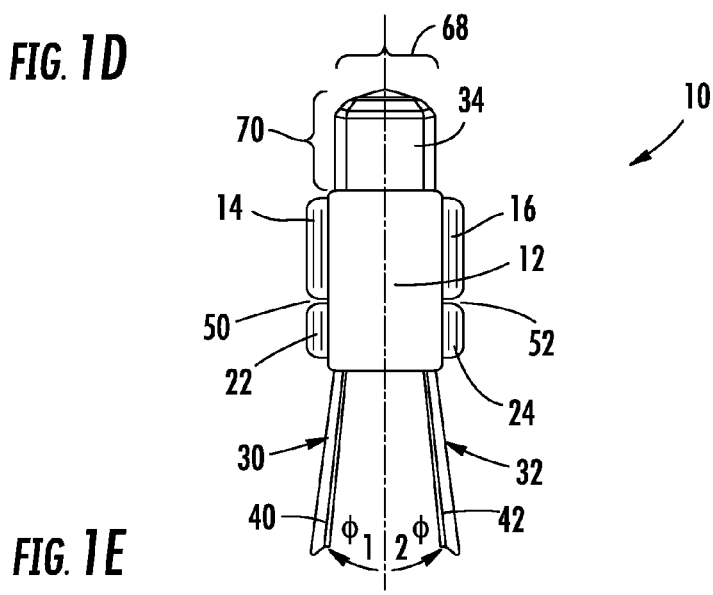
FIG. 1E shows a back view of a connector for a fence gate.

As shown in FIG. 1D, the first flange 14 flares outward at an angle $\theta_1$ that ranges from greater than 0 degrees to about 20 degrees from parallel the X-axis 26. More preferably, the angle $\theta_1$ ranges from about 7 degrees to about 11 degrees, and is most preferably about 9 degrees. The fifth flange 22 flares outward at an angle $\theta_3$ that is substantially similar to angle $\theta_1$ and that ranges from greater than 0 degrees to about 20 degrees from parallel the X-axis 26. More preferably, the angle $\theta_3$ ranges from about 7 degrees to about 11 degrees, and is most preferably about 9 degrees. Similarly, from the same frame of reference, the second flange 16 flares outward from parallel the X-axis 26 at an angle $\theta_2$ that ranges from less than 0 degrees to about −20 degrees. More preferably, the angle $\theta$, ranges from about −7 degrees to about −11 degrees, and is most preferably about −9 degrees. The sixth flange 24 flares outward from parallel the X-axis 26 at an angle $\theta_4$ that is substantially similar to angle $\theta$, and that ranges from less than 0 degrees to about −20 degrees. More preferably, the angle $\theta_2$ ranges from about −7 degrees to about −11 degrees, and is most preferably about −9 degrees. As shown in FIG. 1E, the third flange 18 flares outward at an angle $\phi_1$ that ranges from greater than 0 degree to about 20 degrees. More preferably, the angle $\phi_1$ ranges from about 7 degrees to about 11 degrees, and is most preferably about 9 degrees. The fourth flange 20 flares outward at an angle $\phi_2$ that ranges from less than 0 degrees to about −20 degrees from parallel with the Y-axis 28. More preferably, the angle $\phi_2$ ranges from about −7 degrees to about −11 degrees, and is most preferably about −9 degrees. The flaring of the flanges (14, 16, 18, 20, 22, and 24) preferably causes these flanges to press against the inside surfaces of a properly sized frame member or properly sized fence panel when the flanges are inserted therein for attachment. The phrase "properly sized" as used herein with regard to an object such as a frame member, beam, rail and/or fence panel is defined as having dimensions such that the flanges of a connector simultaneously exert pressure against the inside surface(s) of such object because of the flaring of the flanges. The flared flanges (14, 16, 18, 20, 22, and 24) are particularly useful when an adhesive is used to secure or further secure the connector 10 to a frame member or a fence panel because the surfaces that are being joined by adhesive are forced to be in substantially constant contact with one another. For example, when the connector 10 is attached to a frame member using an adhesive, the outside surface 30 of the third flange 18 and the outside surface 32 of the fourth flange 20 are forced against the interior surfaces of a properly sized frame member, thereby enhancing the effectiveness of the adhesion process between the connector 10 and the particular frame member.

In the embodiment shown in FIGS. 1A-1E, the connector 10 also includes an extension 34 for attaching the connector 10 to a frame member. The extension 34 is preferably chamfered as shown in FIG. 1A. Using the extension 34, the connector 10 also may act as a "T joint" as well as an "elbow joint" for the frame of a fence gate structure.

The connector 10 is particularly well-suited for attaching on-site adjusted (e.g., cut) fence panels and on-site adjusted frame members together because all that is necessary for attachment is that the appropriate flanges (14, 16, 18, 20, 22, and 24) of the connector be inserted into a properly sized fence panel or properly sized frame member with a minimal amount of adhesive to hold the structures together.

In an alternative embodiment, the connector 10 does not include a fifth flange 22 or a sixth flange 24. In a related alternative embodiment, the connector also does not include an extension 34. The connector 10 is preferably manufactured as a single structure, preferably by extrusion whereby the connector is made of mostly polyvinyl chloride (PVC).

Figure 1F:
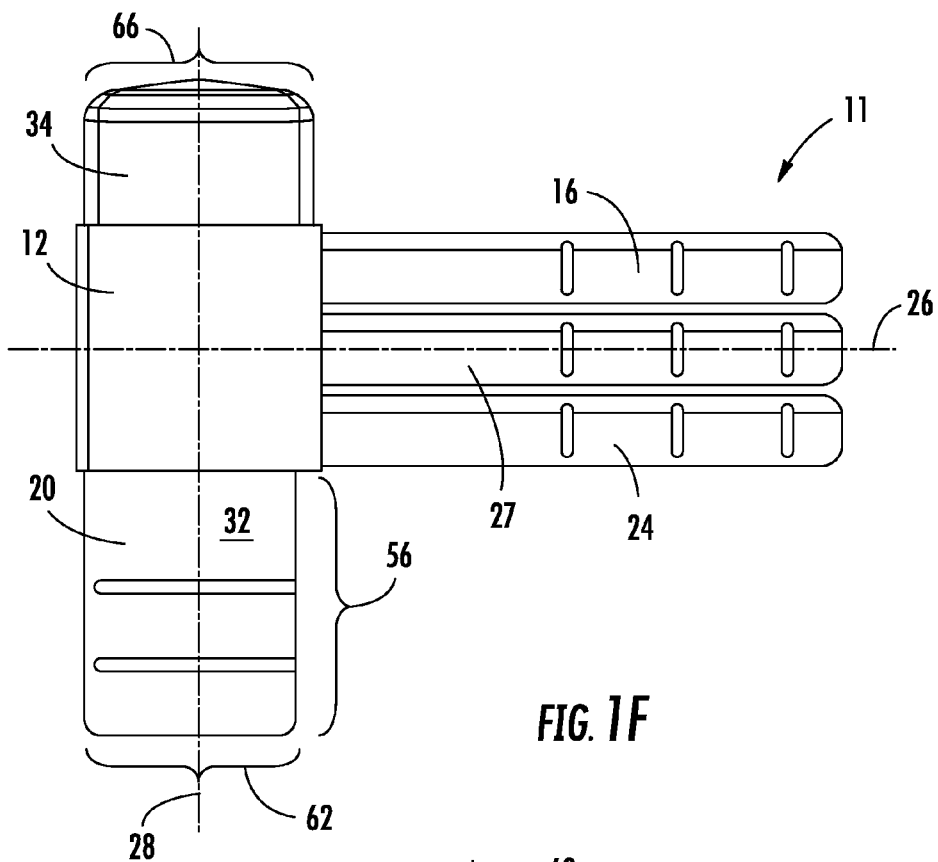
FIG. 1F shows a side view of a preferred embodiment of a connector for a fence gate.
Figure 1G:
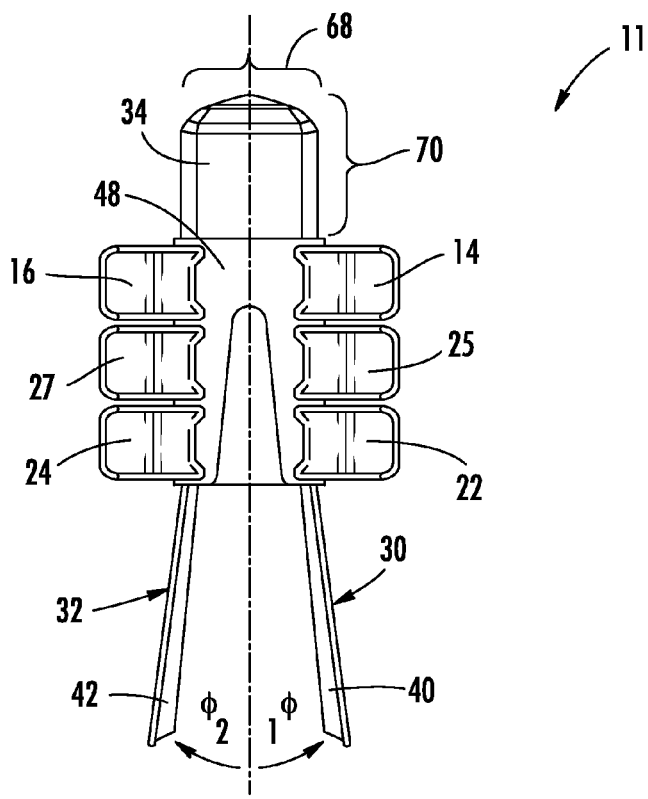
FIG. 1G shows a front view of a preferred embodiment of a connector for a fence gate.
Figure 1H:
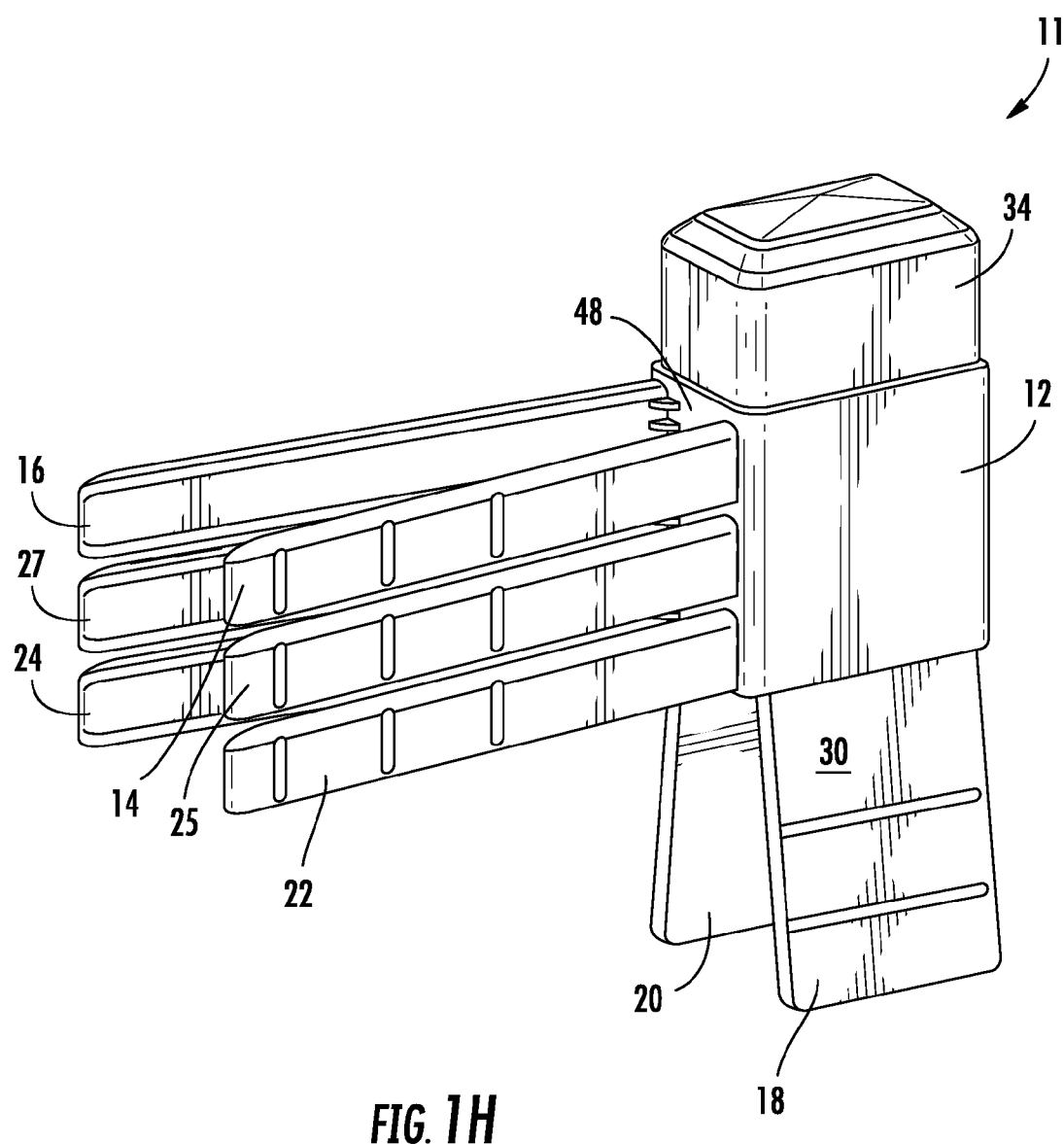
FIG. 1H shows a perspective view of a preferred embodiment of a connector for a fence gate.

In a particularly preferred embodiment shown in FIGS. 1F-1H, a connector 11 includes a seventh flange 25 and an eighth flange 27. In this embodiment, the flanges are all preferably about the same size. The seventh flange 25 and the eighth flange 27 are preferably oriented in similar fashion as the first flange 14, the second flange 16, the fifth flange 22, and the sixth flange 24.

A first edge 36 of the first flange 14 and a first edge 38 of the second flange 16 are preferably rounded (as shown in FIG. 1A, FIG. 1B, and FIG. 1D) to strengthen the structure of the flanges (14, 16) and to act as locators when the connector 10 is being used to assemble a fence gate. Similarly, a first edge 40 of the third flange 18 and a first edge 42 of the fourth flange 20 are preferably rounded (as shown in FIG. 1B and FIG. 1E) to strengthen the structure of the flanges (18, 20) and to act as locators when the connector 10 is being used to assemble a fence gate. Corners such as corner 44 on the first flange 14 are preferably curved or beveled (as shown in 1C) to facilitate insertion of the flanges (14, 16, 18, 20, 22, and 24) into a portion of a fence panel or an end of a frame member. In a preferred embodiment, the flanges (14, 16, 18, 20, 22, and 24) include grooves 46 that help enhance various types of adhesive applications. The hub 12 also preferably includes a rib 48 as shown in FIG. 1A for strengthening the three-dimensional structure of the connector 10. The six-flange structure of the embodiment of the connector shown in FIGS. 1A-1E includes a first slot 50, located between the first flange 14 and the fifth flange 22, and a second slot 52, located between the second flange 16 and the sixth flange 24. These slots (50, 52) allow for the connector 10 to fittingly engage a variety of different profiles of rails located on or in various styles of fence panels.

Examples of various rail profiles that various embodiments of the connector 10 may engage with are shown in FIGS. 5-10. In a preferred embodiment, the flanges (14, 16, 22, 24) of connector 10 are dimensioned to fit within the rail profile 502 of FIGS. 5A-5C, wherein FIG. 5A shows the profile 502 with dimensions given in inches. FIG. 5B shows a perspective view of a rail 504 having profile 502, and FIG. 5C shows a side view of the rail 504.

Figure 6A:
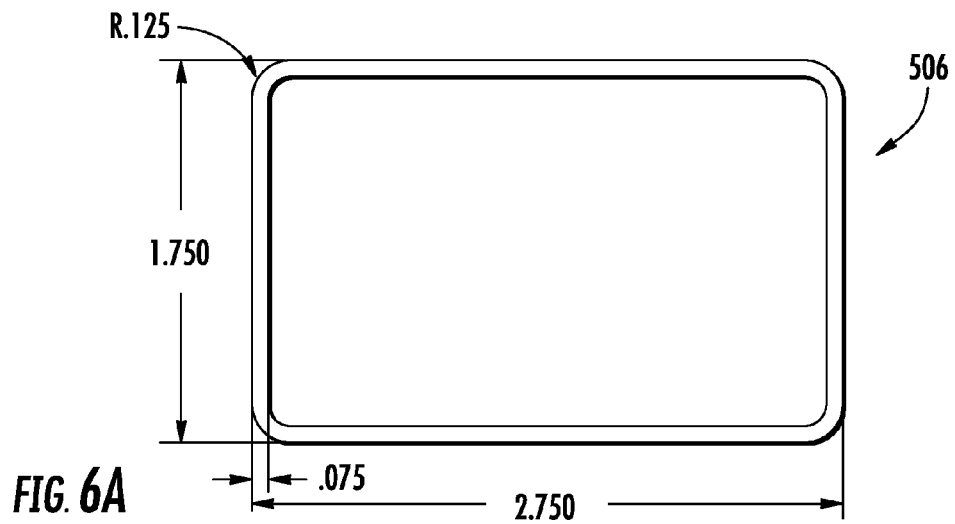
FIG. 6A shows an end view showing the profile of a rail for a fence panel.
Figure 6B:
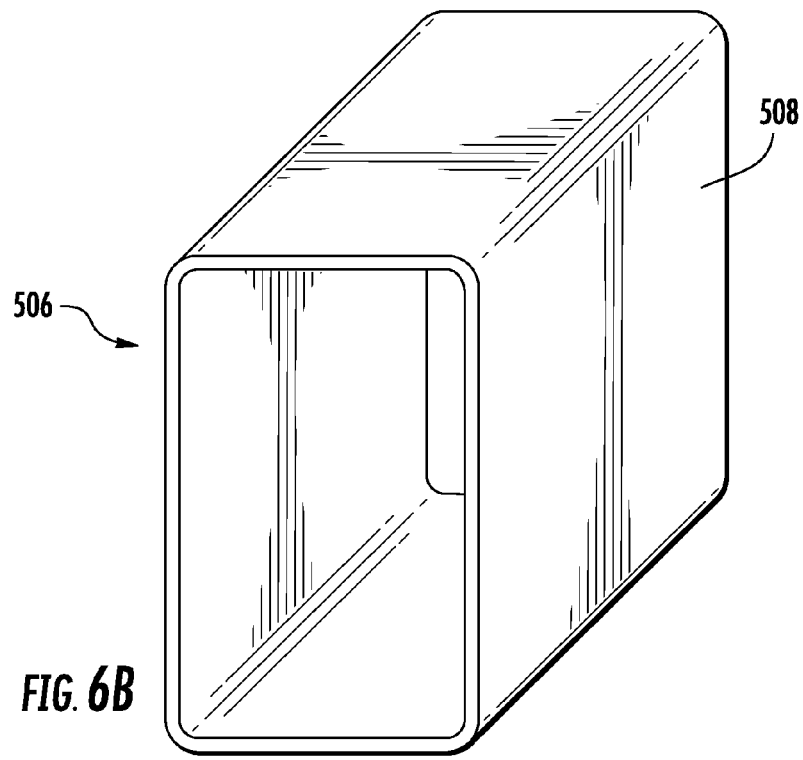
FIG. 6B shows a perspective view of a rail for a fence panel.
Figure 6C:
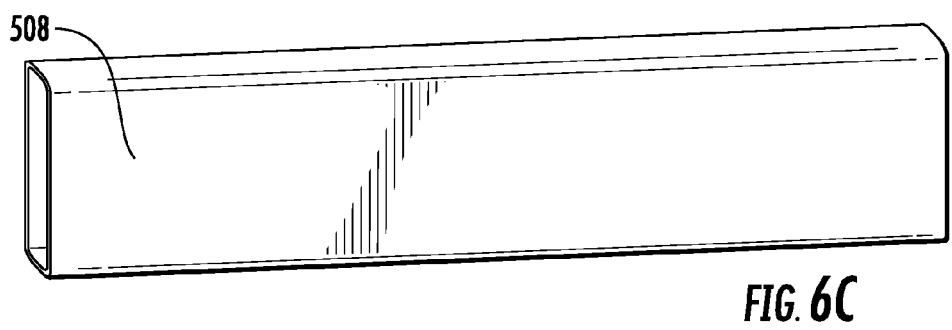
FIG. 6C shows a perspective side view of a rail for a fence panel.

In another preferred embodiment, the flanges (14, 16, 22, 24) of connector 10 are dimensioned to fit within the rail profile 506 of FIGS. 6A-6C, wherein FIG. 6A shows the profile 506 with dimensions given in inches. FIG. 6B shows a perspective view of a rail 508 having profile 506, and FIG. 6C shows a side view of the rail 508.

Figure 7A:
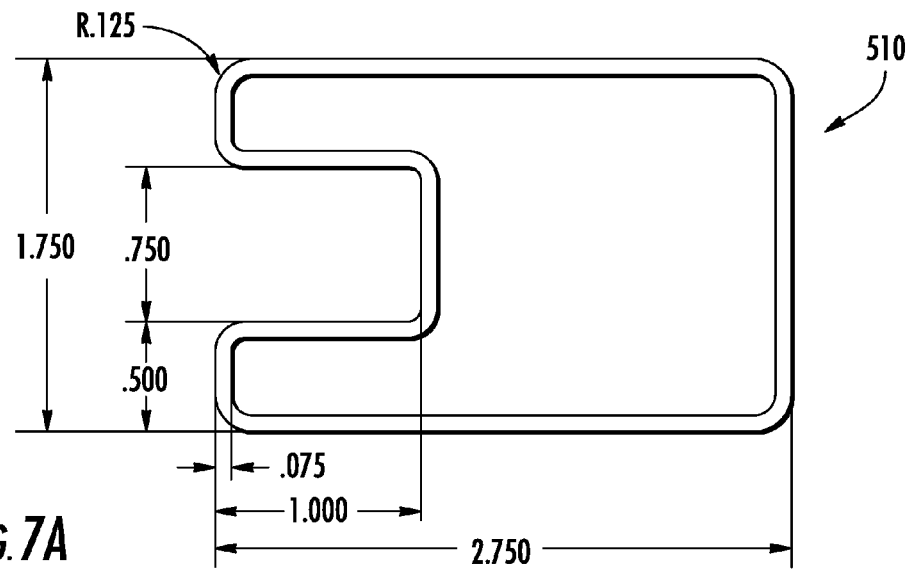
FIG. 7A shows an end view showing the profile of a rail for a fence panel.
Figure 7B:
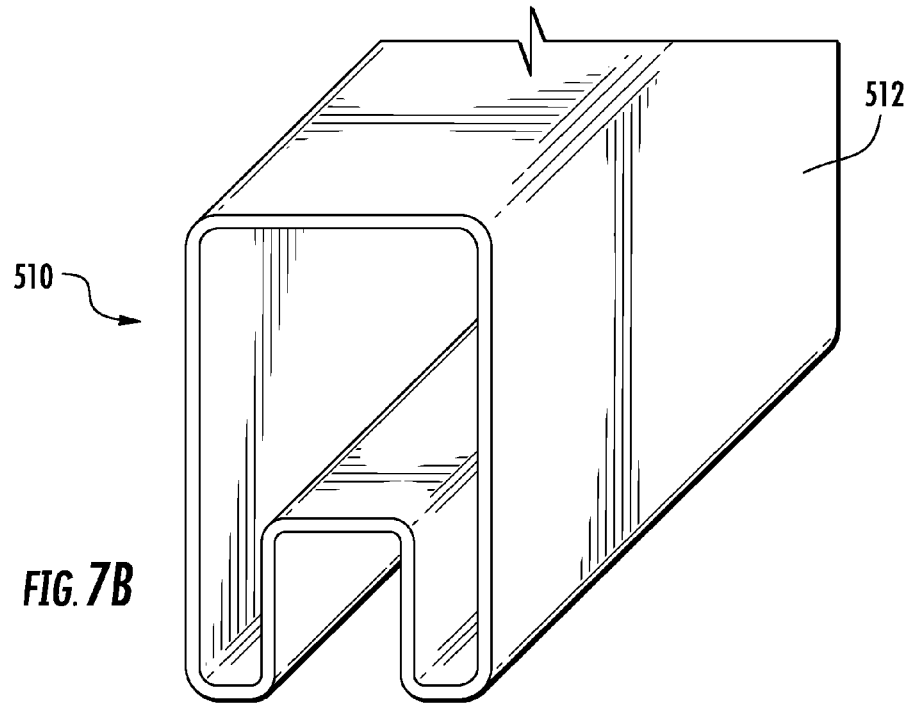
FIG. 7B shows a perspective view of a rail for a fence panel.
Figure 7C:
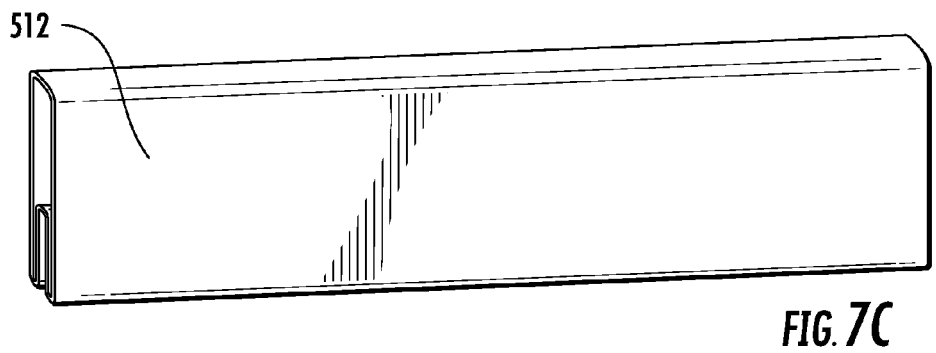
FIG. 7C shows a perspective side view of a rail for a fence panel.

In yet another preferred embodiment, the flanges (14, 16, 22, 24) of connector 10 are dimensioned to fit within the rail profile 510 of FIGS. 7A-7C, wherein FIG. 7A shows the profile 510 with dimensions given in inches. FIG. 7B shows a perspective view of a rail 512 having profile 510, and FIG. 7C shows a side view of the rail 512.

Figure 8A:
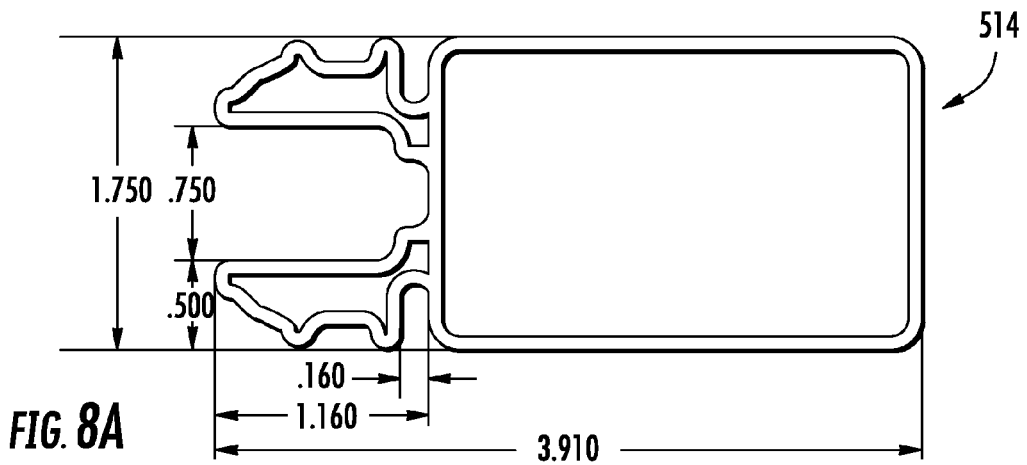
FIG. 8A shows an end view showing the profile of a rail for a fence panel.
Figure 8B:
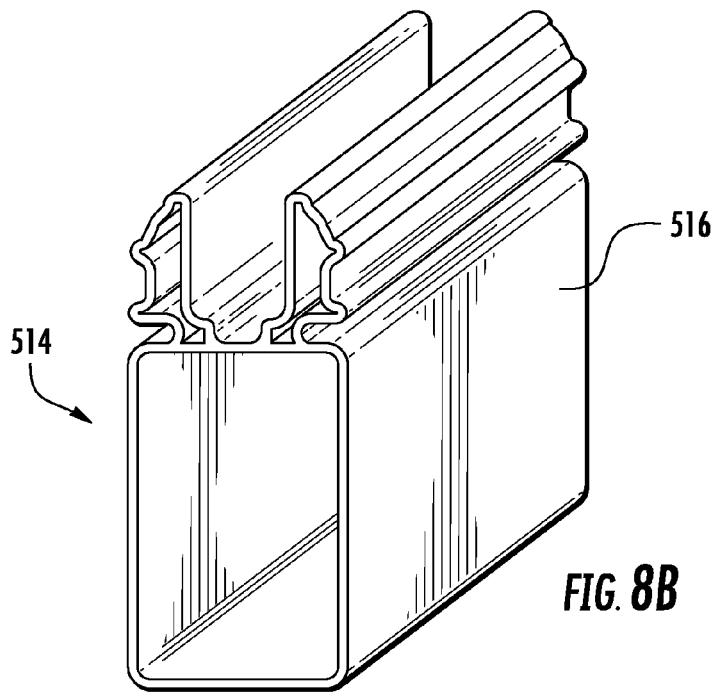
FIG. 8B shows a perspective view of a rail for a fence panel.
Figure 8C:
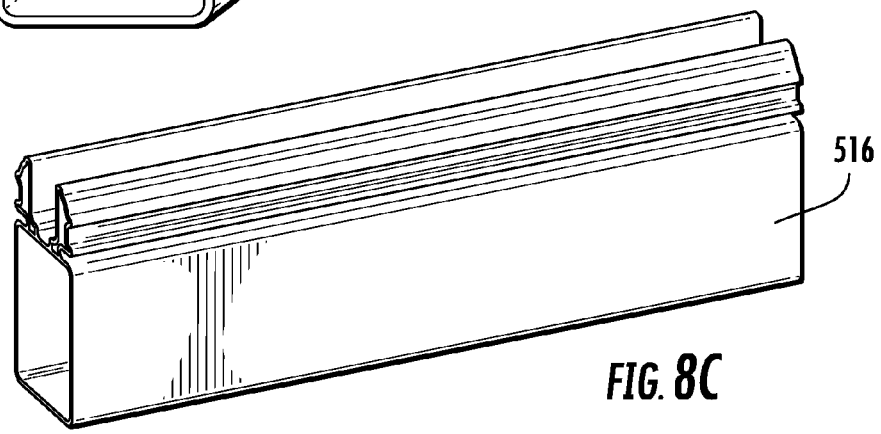
FIG. 8C shows a perspective side view of a rail for a fence panel.

In another preferred embodiment, the flanges (14, 16, 22, 24) of connector 10 are dimensioned to fit within the rail profile 514 of FIGS. 8A-8C, wherein FIG. 8A shows the profile 514 with dimensions given in inches. FIG. 8B shows a perspective view of a rail 516 having profile 514, and FIG. 8C shows a side view of the rail 516.

Figure 9A:
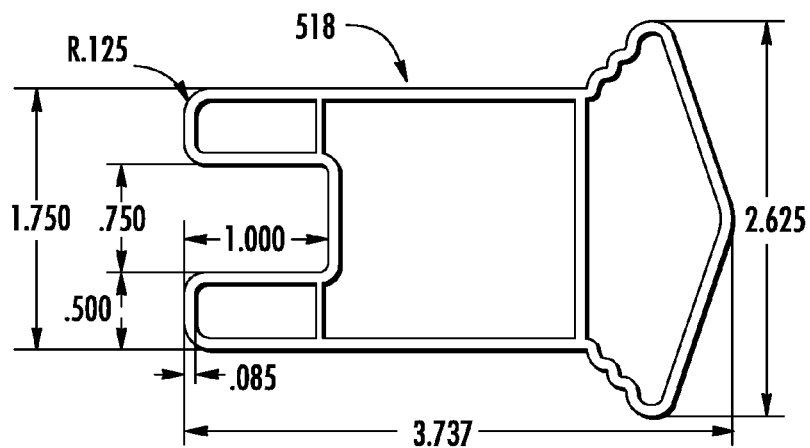
FIG. 9A shows an end view showing the profile of a rail for a fence panel.
Figure 9B:
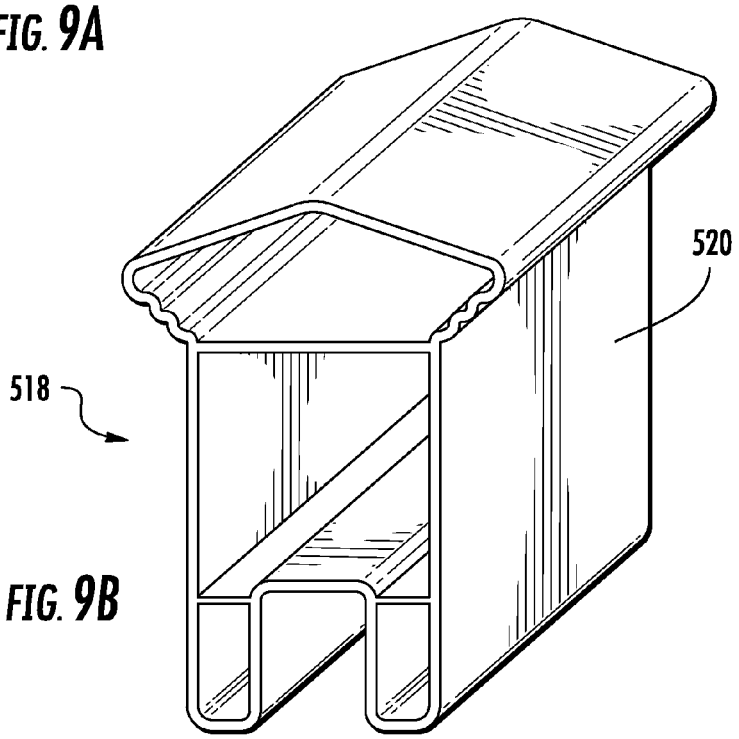
FIG. 9B shows a perspective view of a rail for a fence panel.
Figure 9C:
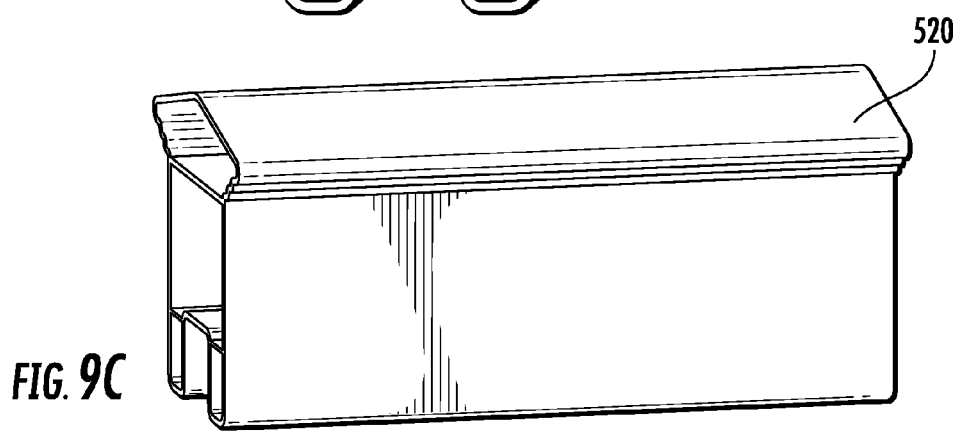
FIG. 9C shows a perspective side view of a rail for a fence panel.

In another preferred embodiment, the flanges (14, 16, 22, 24) of connector 10 are dimensioned to fit within the rail profile 518 of FIGS. 9A-9C, wherein FIG. 9A shows the profile 518 with dimensions given in inches. FIG. 9B shows a perspective view of a rail 520 having profile 518, and FIG. 9C shows a side view of the rail 520.

Figure 10A:
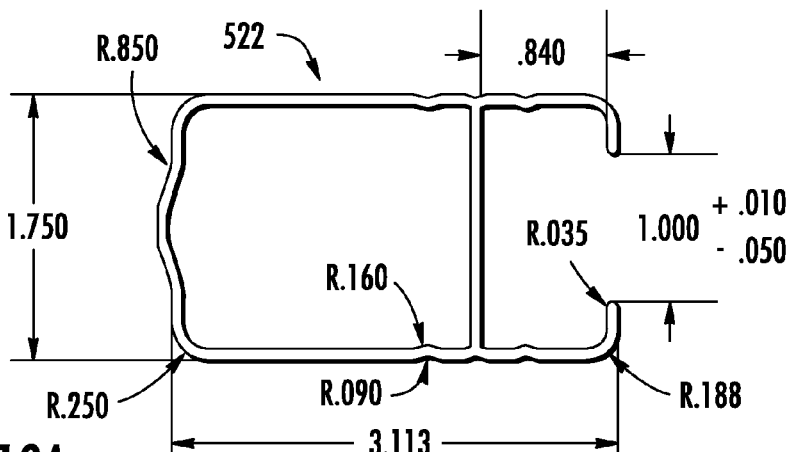
FIG. 10A shows an end view showing the profile of a rail for a fence panel.
Figure 10B:
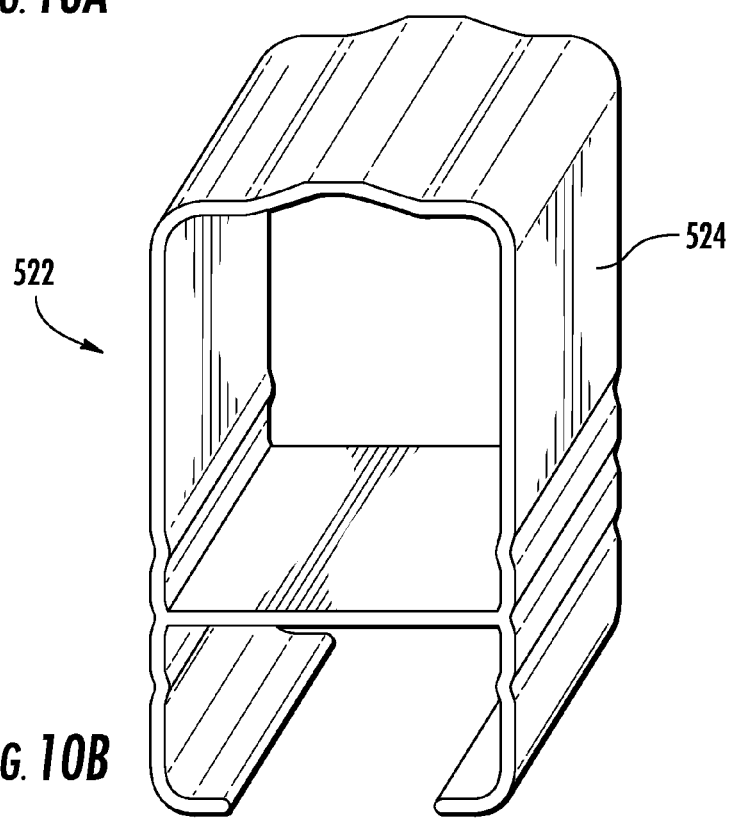
FIG. 10B shows a perspective view of a rail for a fence panel.
Figure 10C:
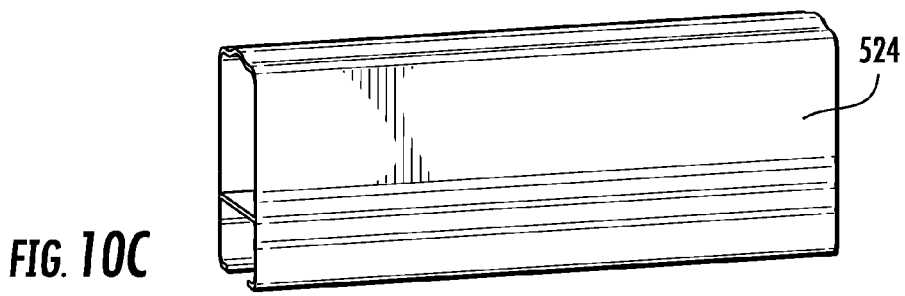
FIG. 10C shows a perspective side view of a rail for a fence panel.

In yet another preferred embodiment, the flanges (14, 16) of connector 10 are dimensioned to fit within the rail profile 522 of FIGS. 10A-10C, wherein FIG. 10A shows the profile 522 with dimensions given in inches. However, in this particular embodiment, the fifth flange 22 and the sixth flange 24 are preferably removed from the connector. Flanges (22, 24) may be removed by simply cutting the flanges (22, 24) off of the connector 10 structure. However, any method of removing flanges (22, 24) from the connector 10 known to a person having ordinary skill in the art may be used. FIG. 10B shows a perspective view of a rail 524 having profile 522, and FIG. 10C shows a side view of the rail 524. Although specific dimensions are given in FIG. 5A, FIG. 6A, FIG. 7A, FIG. 8A, FIG. 9A, and FIG. 10A in the units of inches, it should be understood that other dimensions and changes in scale of the given dimensions are contemplated by the invention described herein.

As shown in FIG. 1C, the length 54 of the first flange 14 and the second flange 16 preferably ranges from about 2 inches to about 10 inches, more preferably from about 4 inches to about 8 inches, and most preferably about 6 inches. The length 56 of the third flange 18 and the fourth flange 20 preferably ranges from about 1 inch to about 5 inches, more preferably from about 2 inches to about 4 inches, and most preferably about 3 inches. The length 58 of the fifth flange 22, if applicable, and the sixth flange 24, if applicable, preferably ranges from about 2 inches to about 10 inches, more preferably from about 4 inches to about 8 inches, and most preferably about 8 inches. Similarly, the length of the seventh flange 25, if applicable, and the eighth flange 27, if applicable, preferably ranges from about 2 inches to about 10 inches, more preferably from about 4 inches to about 8 inches, and most preferably about 8 inches. In the embodiment shown in FIGS. 1A-1E, the width 60 of the first flange 14 and the second flange 16 preferably ranges from about 1.4 inches to about 2.0 inches, more preferably from about 1.6 inches to about 1.8 inches, and most preferably about 1.7 inches. The width 62 of the third flange 18 and the fourth flange 20 preferably ranges from about 2.0 inches to about 2.8 inches, more preferably from about 2.2 inches to about 2.6 inches, and most preferably about 2.4 inches. The width 64 of the fifth flange 22, if applicable, and the sixth flange 24, if applicable, preferably ranges from about 0.6 inches to about 1.1 inches, more preferably from about 0.7 inches to about 1.0 inches, and most preferably about 0.86 inches. The length 66 of the extension 34, if applicable, preferably ranges from about 2.2 inches to about 3.0 inches, more preferably from about 2.4 inches to about 2.8 inches, and most preferably about 2.6 inches. The width 68 of the extension 34, if applicable, preferably ranges from about 1.2 inches to about 2.0 inches, more preferably from about 1.4 inches to about 1.8 inches, and most preferably about 1.6 inches. The height 70 of the extension 34, if applicable, preferably ranges from about 1.2 inches to about 2.0 inches, more preferably from about 1.4 inches to about 1.8 inches, and most preferably about 1.6 inches.

In the embodiment shown in FIGS. 1F-1H, the width of the first flange 14 and the second flange 16 preferably ranges from about 0.6 inches to about 1.1 inches, more preferably from about 0.7 inches to about 1.0 inches, and most preferably about 0.86 inches. Similarly, the width of the seventh flange 25 and the eighth flange 27 preferably ranges from about 0.6 inches to about 1.1 inches, more preferably from about 0.7 inches to about 1.0 inches, and most preferably about 0.86 inches. For the purposes of this embodiment, the other measurements discussed above with regard to the embodiment shown in FIGS. 1A-1E remain substantially the same.

Figure 19A:
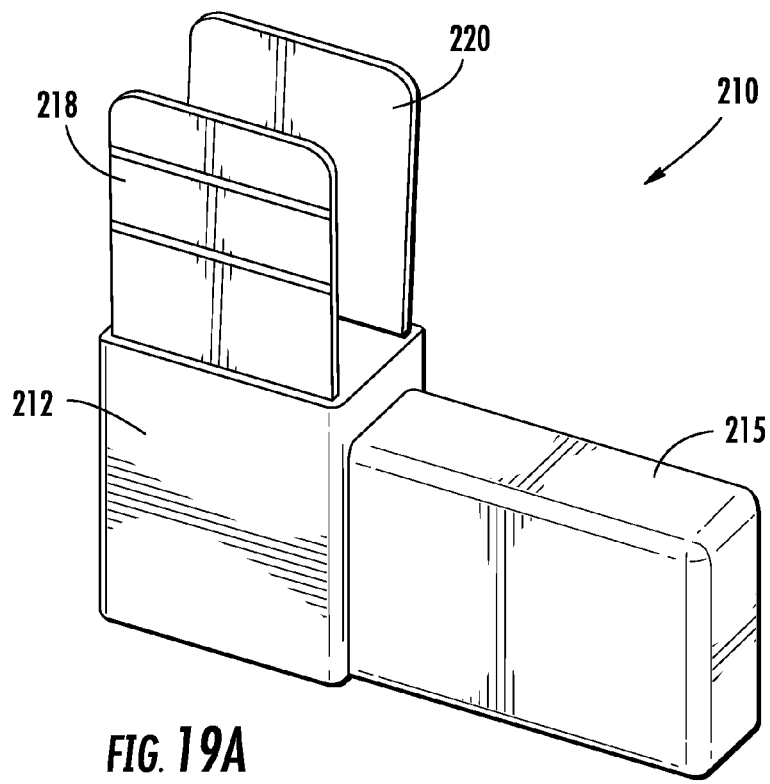
FIG. 19A shows a perspective view of a connector for a fence gate.
Figure 19B:
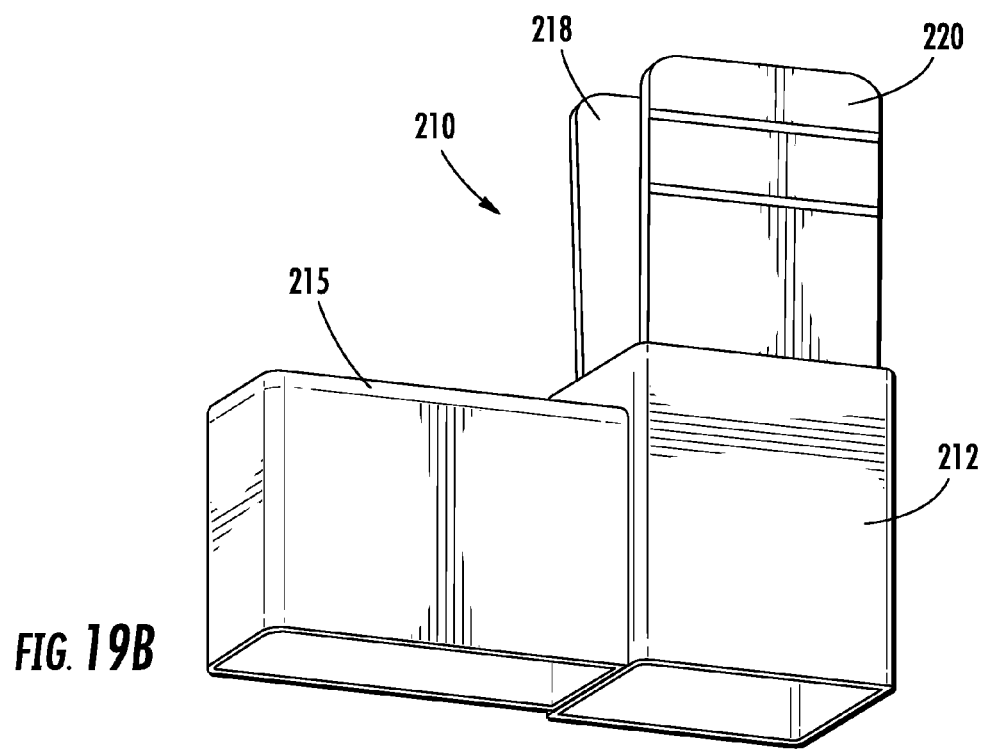
FIG. 19B shows a perspective view of a connector for a fence gate.

An alternate embodiment of a connector 210 is shown in FIGS. 19A and 19B including a hub 212. The connector 210 differs from other embodiments described herein (e.g., connector 10 and connector 11) at least in part because it includes a singular projection 215 in lieu of a separated first flange and second flange. Connector 210 does include a third flange 218 and a fourth flange 220 that are substantially similar to third flange 18 and fourth flanges 20. The projection 215 may be attached to a rail of a fence panel, preferably by inserting the projection 215 into an end of a rail and attaching the connector 210 and the rail together, preferably using an adhesive or one or more screws. The flanges (218, 220) are attachable to a beam in the manner described above with regard to flanges (18, 20).

Figure 11:
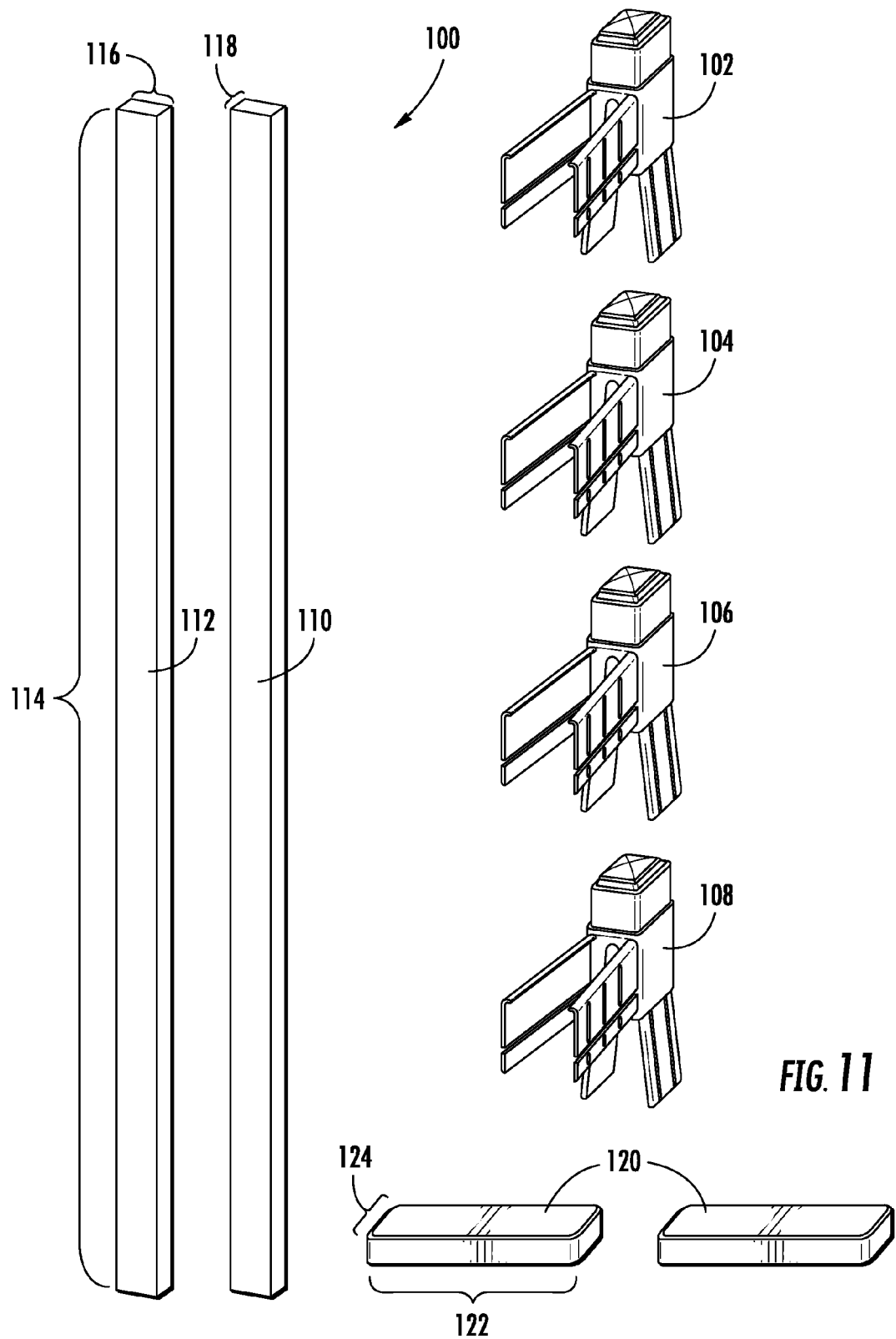
FIG. 11 shows a kit of parts for assembling a fence gate.

As shown in FIG. 11, an embodiment of the invention described herein also includes a kit 100 of parts for assembling a fence gate. In a preferred embodiment, the kit 100 includes four connectors as described above including a first connector 102, a second connector 104, a third connector 106, and a fourth connector 108. The kit 100 also includes frame members in the form of elongate beams, namely, a first beam 110 and a second beam 112. The beams (110, 112) preferably range in length 114 from about 76 inches to about 60 inches, more preferably about 68 inches. The width 116 of beams (110, 112) preferably ranges from about 2.0 inches to about 3.5 inches, and more preferably about 2.75 inches. The thickness 118 of beams (110, 112) preferably ranges from about 1.0 inches to about 2.5 inches, and more preferably about 1.75 inches. Beams (110, 112) are preferably hollow along their entire length. The kit 100 may also include a pair of end caps 120, having a length 122 ranging from about 2.0 inches to about 3.5 inches, and more preferably about 2.75 inches; and a width 124 ranging from about 1.0 inches to about 2.5 inches, and more preferably about 1.75 inches. The end caps 120 may be placed over the ends of the flanges of the connectors to protect the flanges by inhibiting outward flexure of the flanges while the flanges are being transported, stored, and/or when the flanges are in packaging. The kit 100 may also include a container of adhesive, preferably PVC vinyl fence cement, for attaching the parts of the kit 100 to a fence panel. The kit 100 may also include a fence panel, such as fence panel 128 shown in FIG. 2A. One embodiment of the kit 100 includes four connectors (102, 104, 106, and 108), two beams (110, 112), end caps 120, a container of adhesive, and a fence panel.

Figure 2A:
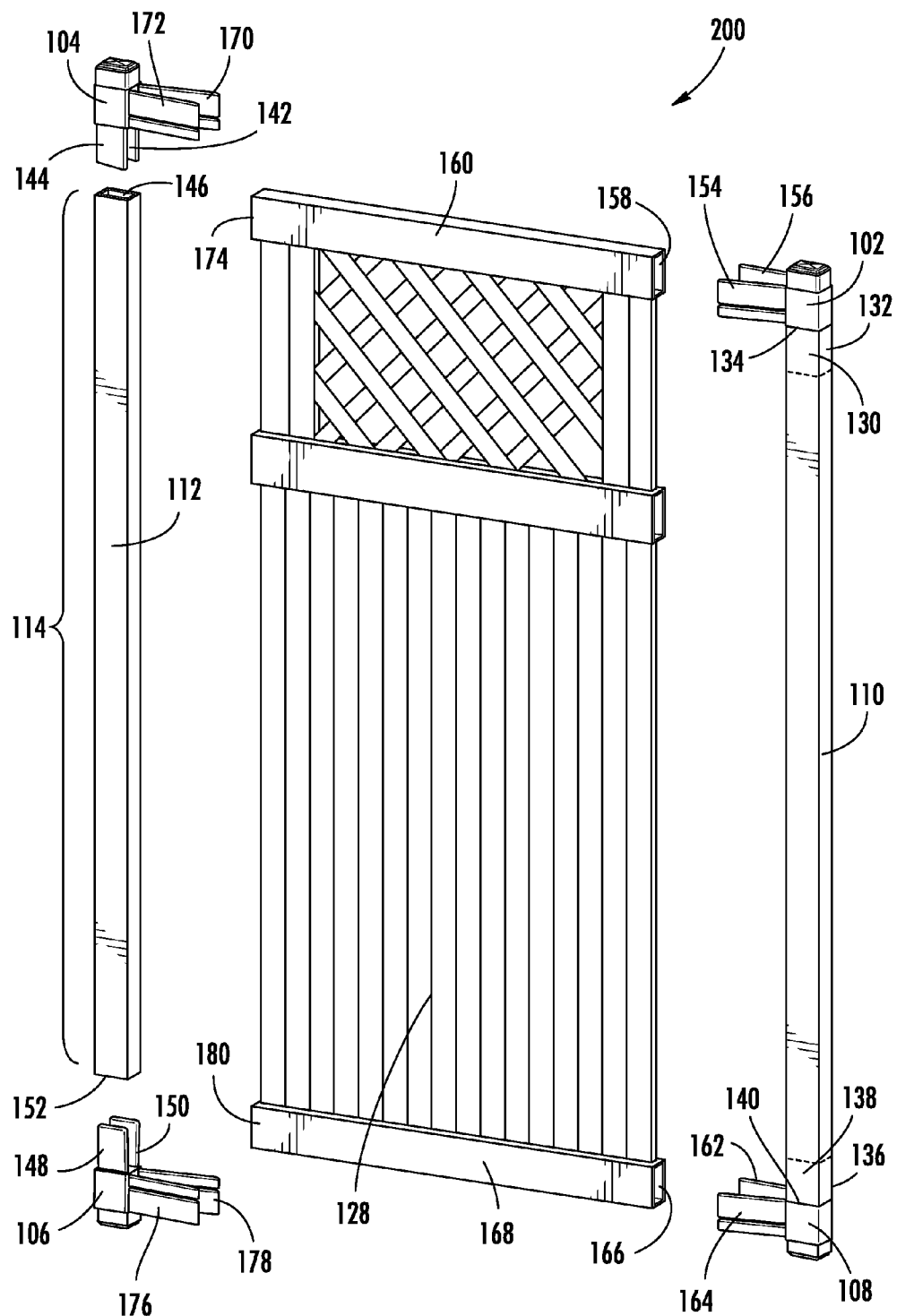
FIG. 2A shows an exploded view of a fence gate.

As shown in FIG. 2A, the kit 100 may be assembled by attaching a third flange 130 of the first connector 102 and a fourth flange 132 of the first connector 102 to a first end 134 of the first beam 110. Additionally, a third flange 136 of the fourth connector 108 and a fourth flange 138 of the fourth connector 108 are attached to a second end 140 of the first beam 110. Also, a third flange 142 of the second connector 104 and a fourth flange 144 of the second connector 104 are attached to a first end 146 of the second beam 112, and a third flange 148 of the third connector 106 and a fourth flange 150 of the third connector 106 are attached to a second end 152 of the second beam 112. A first flange 154 of the first connector 102 and a second flange 156 of the first connector 102 are attached to a first end 158 of a first rail 160 of fence panel 128.

Similarly, a first flange 162 of the fourth connector 108 and a second flange 164 of the fourth connector 108 are attached to a first end 166 of a second rail 168 of fence panel 128. Also, a first flange 170 of the second connector 104 and a second flange 172 of the second connector 104 are attached to a second end 174 of the first rail 160 of fence panel 128. Similarly, a first flange 176 of the third connector 106 and a second flange 178 of the third connector 106 are attached to a second end 180 of the second rail 168 of fence panel 128.

Other embodiments of the kit 100 may include additional beams and/or connectors. For example, in the embodiment depicted in FIG. 4C, the kit 100 also includes a third beams 182 (including first ends 184 and a second ends 186) and fourth beams 188 (including first ends 190 and second ends 192). The third beams (182A and 182B) may be attached to an extension 194A of the first connector 102 and an extension 194B of the second connector (FIG. 4B), respectively. Similarly, the fourth beams (188A and 188B) may be attached to an extension 196A of the third connector 106 and an extension 196B of the fourth connector 108 (FIG. 4B), respectively.

The kit 100 is universal in the sense that a fence gate may be assembled to many different sizes by altering the size of the beams (110, 112) and/or a fence panel and then assembling the parts of the kit 100. This selective sizing capability eliminates the need for ordering specially sized fence gates to fit a particular fence project. Such selective sizing also eliminates the need for wholesalers, home improvement businesses, or other related businesses to carry many different sizes of fence gates.

Figure 20:
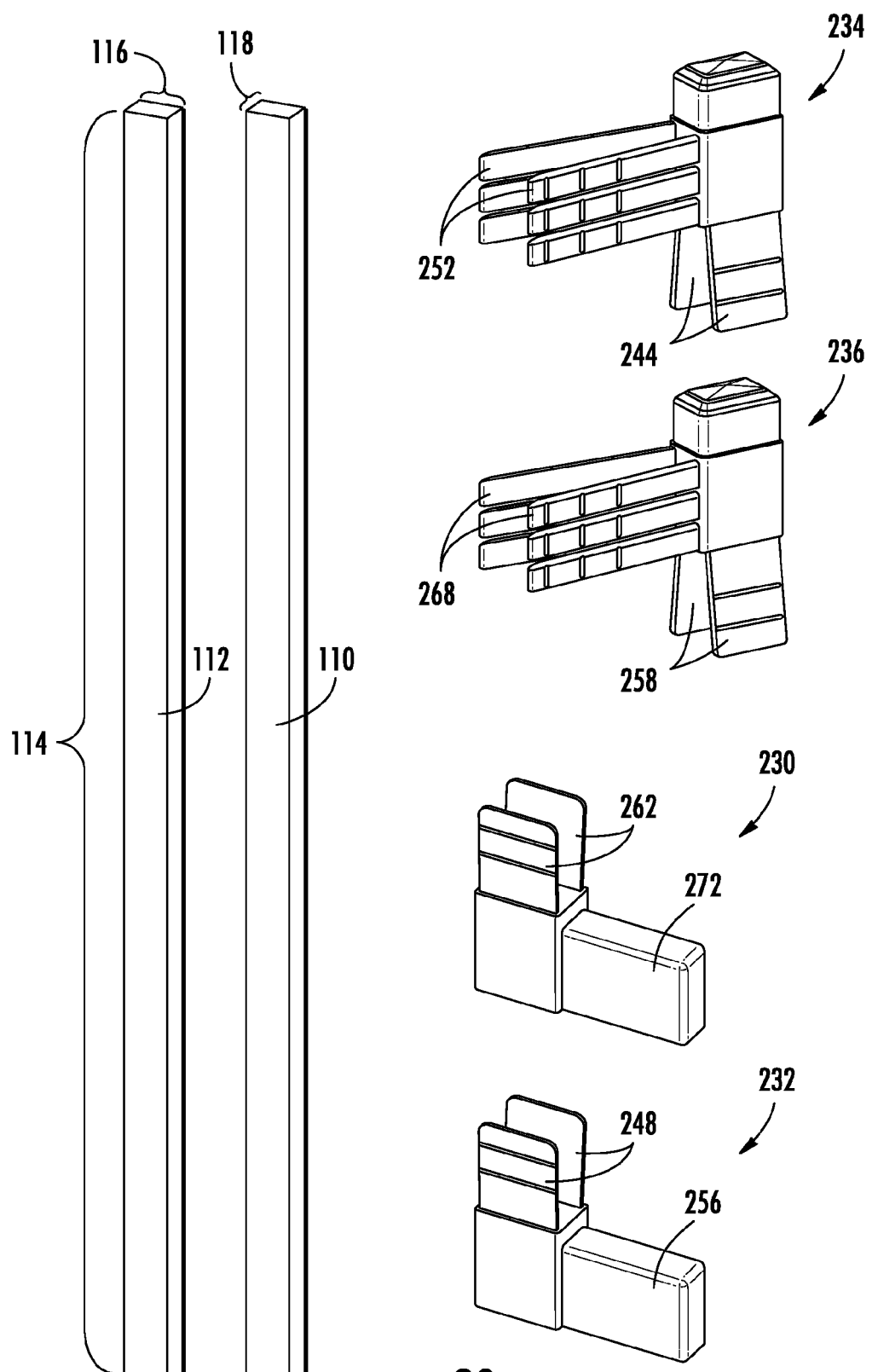
FIG. 20 shows a kit of parts for assembling a fence gate including the connector shown in FIG. 19A and FIG. 19B.
Figure 21:
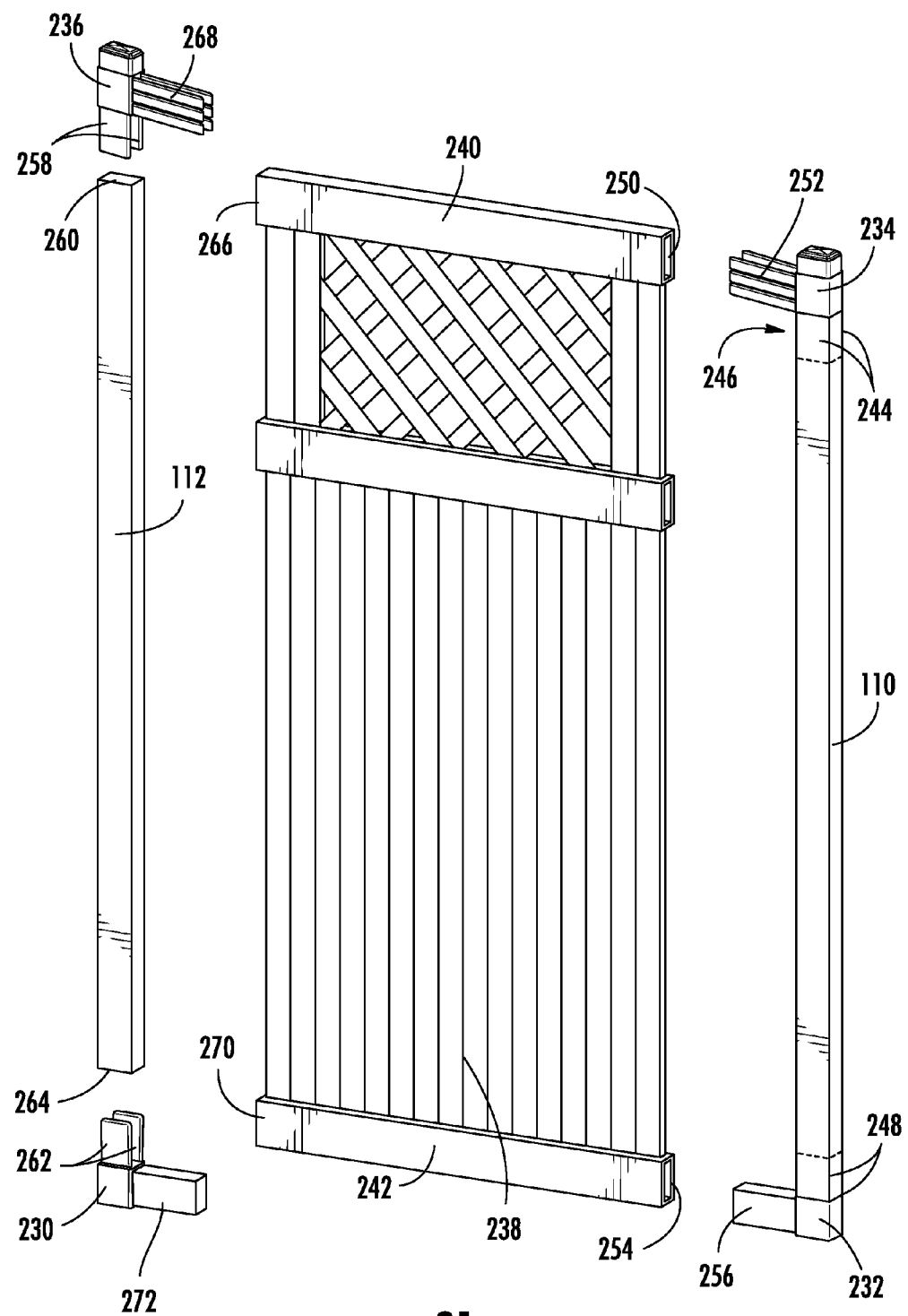
FIG. 21 shows a fence gate assembled using the parts of the kit shown in FIG. 20.

A kit 102 as shown in FIG. 20 includes two connectors 210 including connector 230 and connector 232, and two connectors 11 including connector 234 and connector 236. As with kit 100, kit 102 includes beams (110, 112). The connectors (230, 232) are preferably used to form part of the base of a fence gate as shown in FIG. 21. In a related embodiment, kit 102 includes a fence panel 238 including a first rail 240 and a second rail 242.

A method of assembling the fence gate shown in FIG. 21 includes the steps of attaching flanges 244 of the connector 234 to a first end 246 of the first beam 110, attaching flanges 248 of the connector 232 to a second end of the first beam 110, attaching a first end 250 of the first rail 240 to flanges 252 of connector 234, attaching a first end 254 of the second rail 242 to a projection 256 of connector 232, attaching flanges 258 of the connector 236 to a first end 260 of the second beam 112, attaching flanges 262 of the connector 230 to a second end 264 of the second beam 112, attaching a second end 266 of the first rail 240 to flanges 268 of connector 236, and attaching a second end 270 of the second rail 242 to projection 272 of connector 230.

Figure 2B:
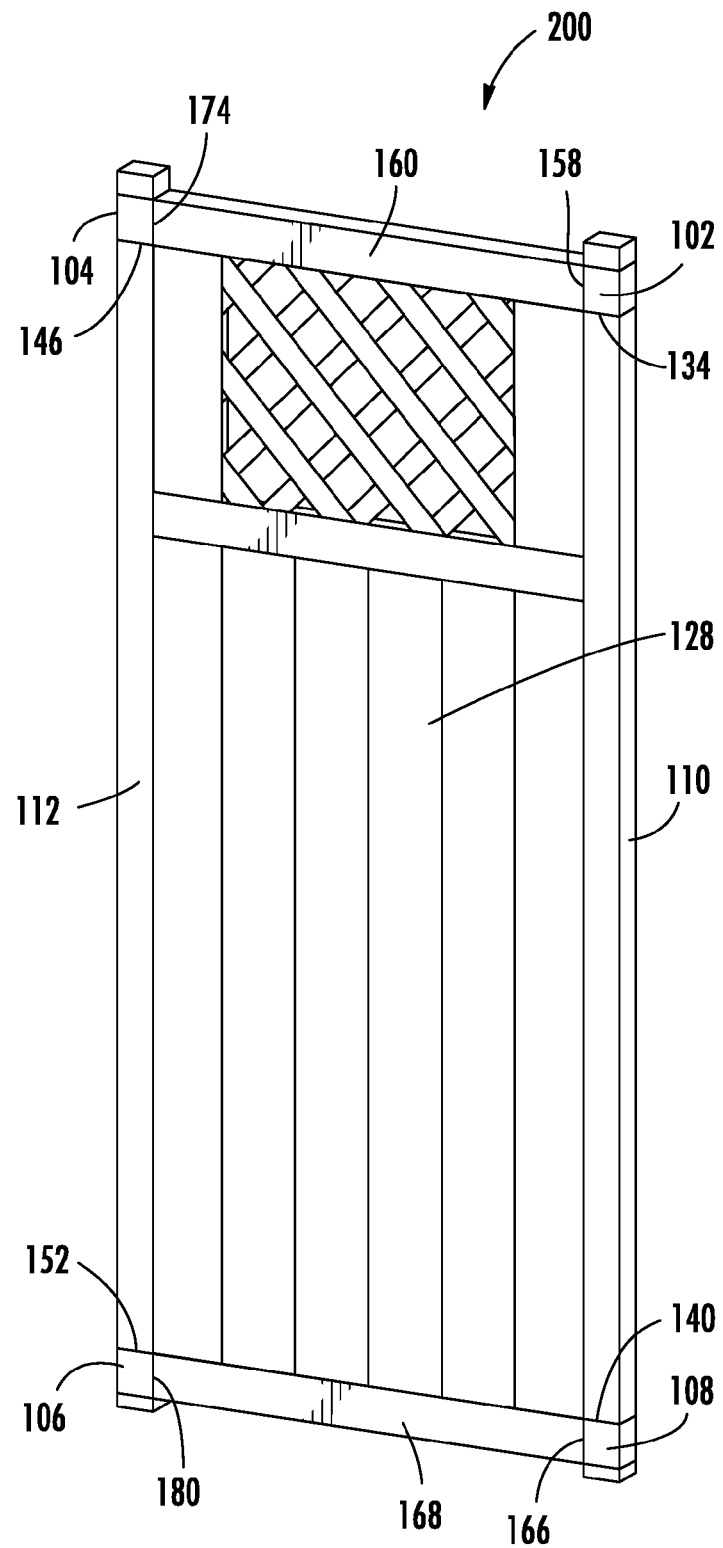
FIG. 2B shows a perspective view of a fence gate.

An embodiment of the invention described herein also includes a fence gate 200 as shown in FIG. 2B. FIG. 2A shows a partially exploded view of gate 200 to better illustrate the various parts of the gate 200. The gate 200 includes four connectors including the first connector 102 (with first flange 154, second flange 156, third flange 130, and fourth flange 132), the second connector 104 (with first flange 170, second flange 172, third flange 142, and fourth flange 144), the third connector 106 (with first flange 176, second flange 178, third flange 148, and fourth flange 150), and the fourth connector 108 (with first flange 162, second flange 164, third flange 136, and fourth flange 138). The gate 200 also includes the first beam 110 (with first end 134 and second end 140), the second beam 112 (with first end 146 and second end 152), and the fence panel 128 (with first rail 160 and second rail 168). The first rail 160 further includes first end 158 and second end 174. The second rail 168 includes first end 166 and second end 180. Fence gate 200 is attached in the manner as described above with regard to the kit 100.

Figure 3A:
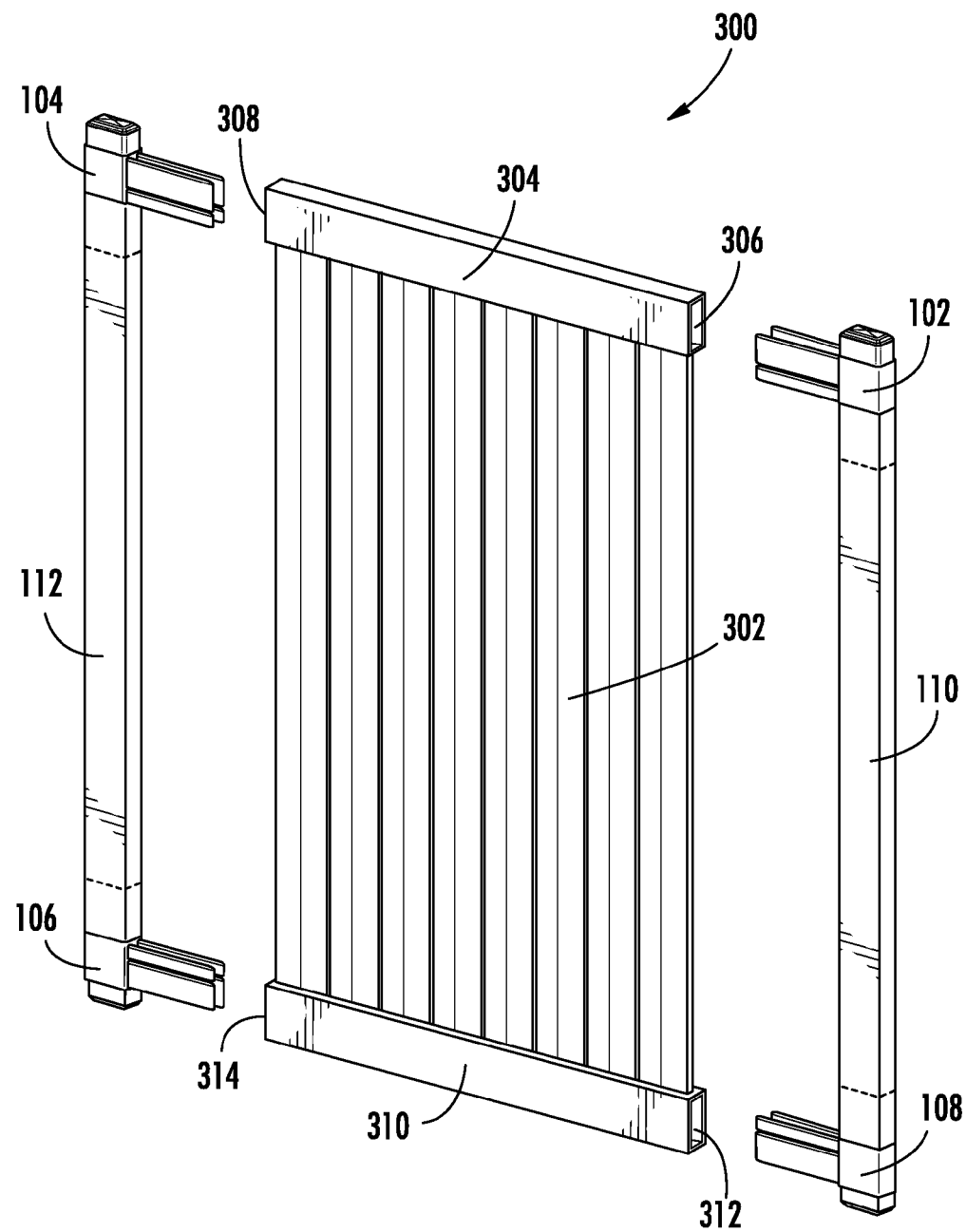
FIG. 3A shows a partially exploded view of a fence gate.
Figure 3B:
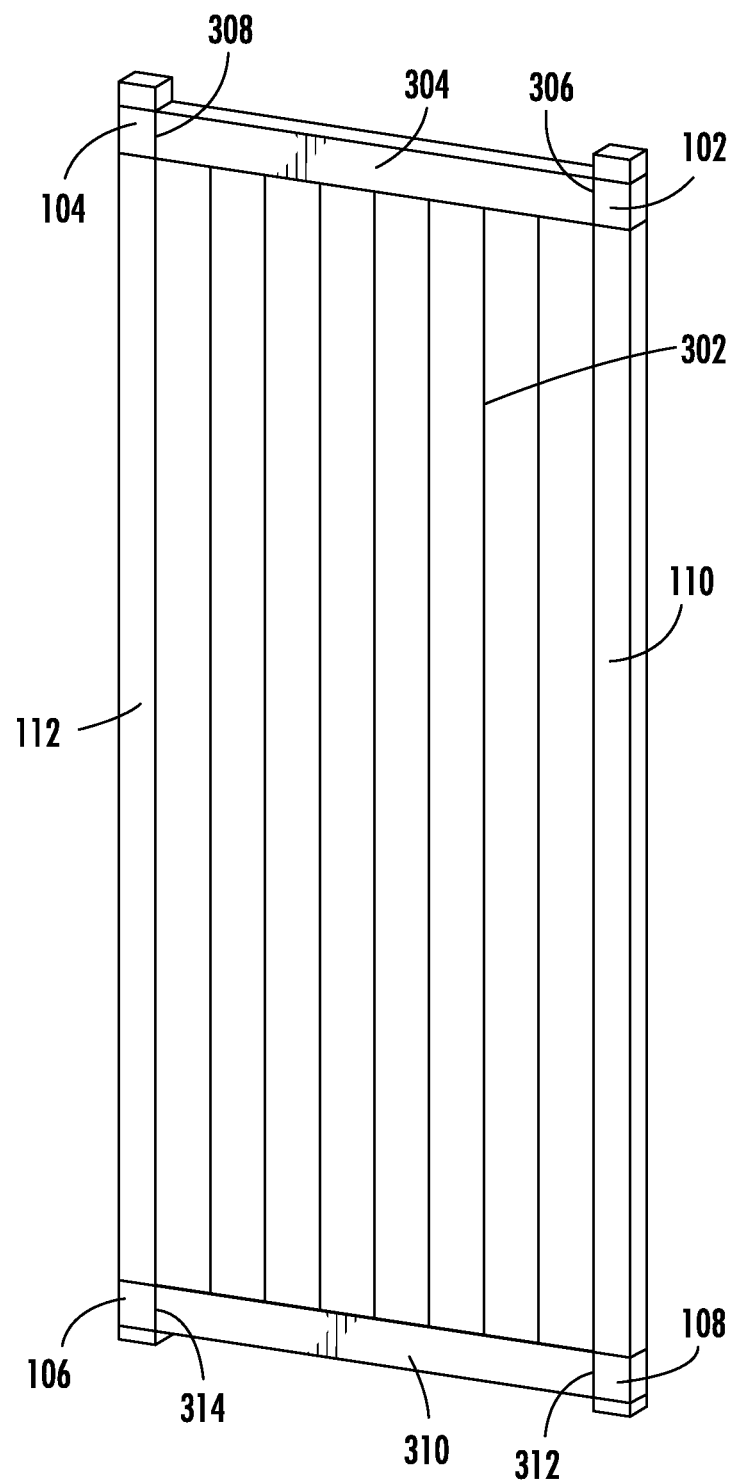
FIG. 3B shows a perspective view of a fence gate.

A related embodiment, shown in FIG. 3A and FIG. 3B, includes fence gate 300. Fence gate 300 also includes four connectors including the first connector 102 (with first flange 154, second flange 156, third flange 130, and fourth flange 132), the second connector 104 (with first flange 170, second flange 172, third flange 142, and fourth flange 144), the third connector 106 (with first flange 176, second flange 178, third flange 148, and fourth flange 150), and the fourth connector 108 (with first flange 162, second flange 164, third flange 136, and fourth flange 138). The gate 300 also includes the first beam 110 (with first end 134 and second end 140), the second beam 112 (with first end 146 and second end 152), and a fence panel 302. The fence panel 302 further includes a first rail 304 (with a first end 306 and a second end 308) and a second rail 310 (with a first end 312 and a second end 314). Fence gate 300 is attached in substantially the same manner as described above with regard to the kit 100. Although fence panel 302 in FIG. 3B is structurally different from fence panel 128 in FIG. 2B, from a structural and functional standpoint, first ends (158, 166) correspond directly with first ends (306, 312) and second ends (174, 180) correspond directly with second ends (308, 314).

Figure 4A:
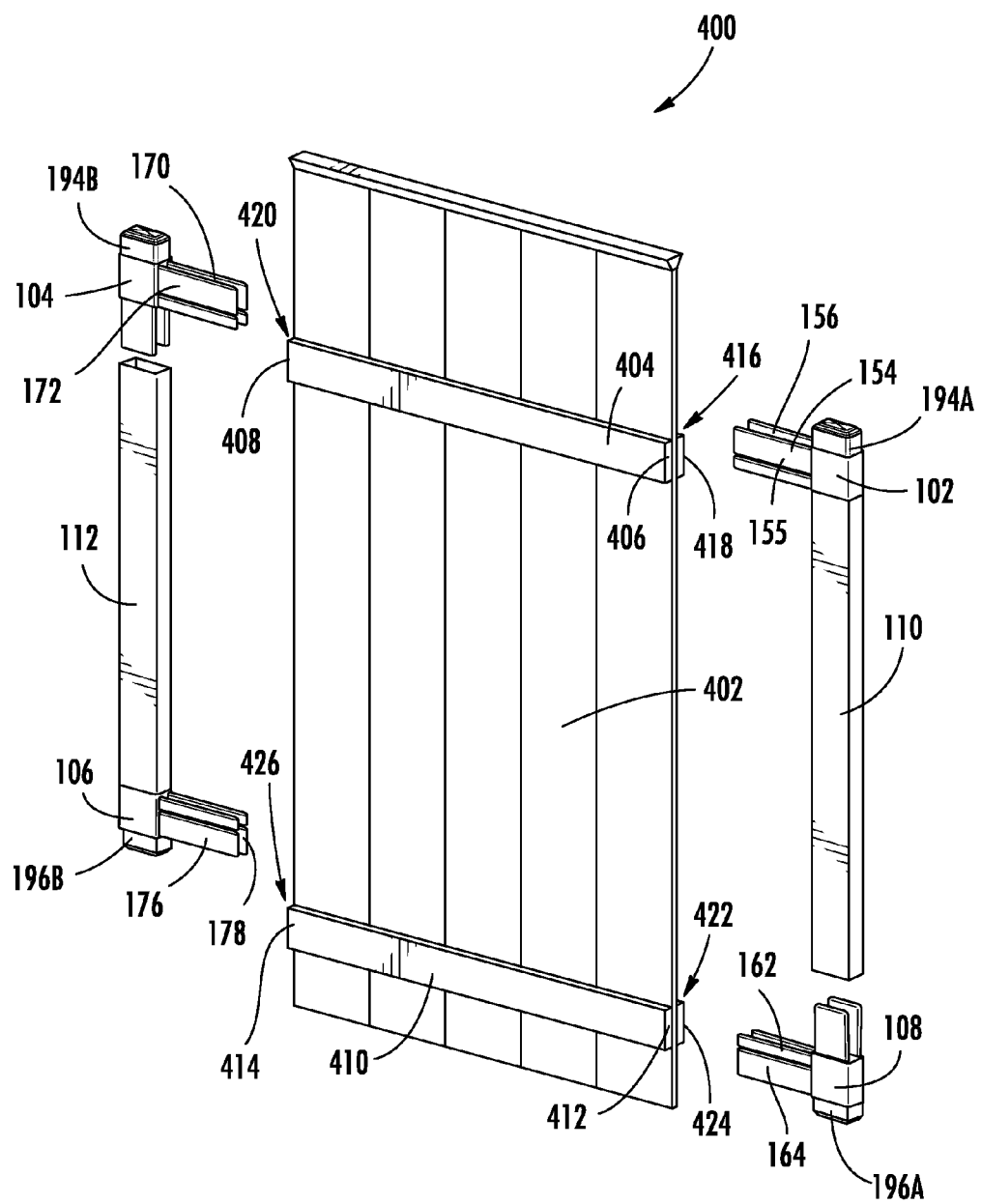
FIG. 4A shows a partially exploded view of a fence gate.
Figure 4B:
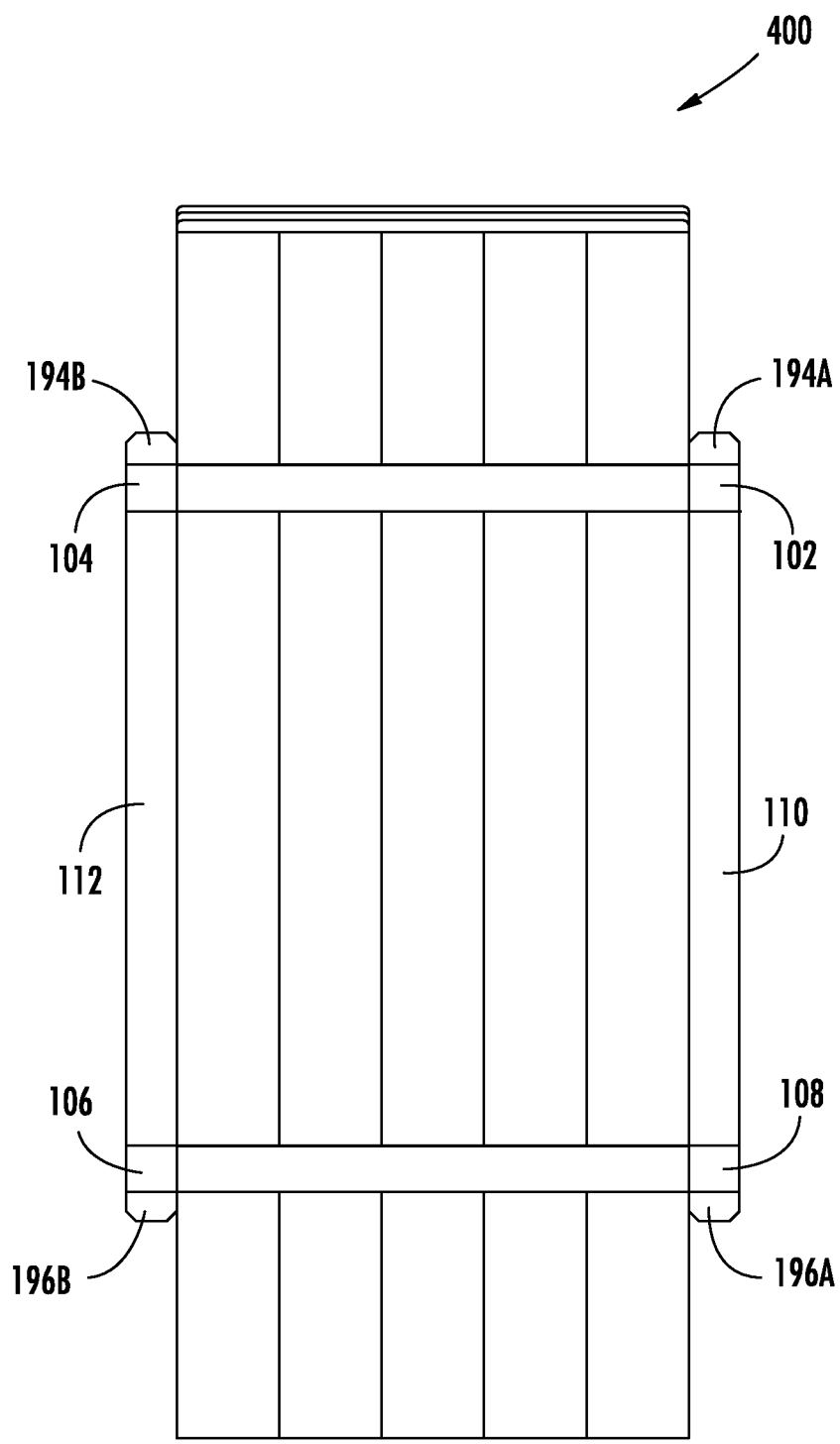
FIG. 4B shows a perspective view of a fence gate.

Another embodiment shown in FIG. 4A and FIG. 4B illustrates a fence gate 400. Gate 400 includes the first connector 102 (with first flange 154, second flange 156, third flange 130, and fourth flange 132), the second connector 104 (with first flange 170, second flange 172, third flange 142, and fourth flange 144), the third connector 106 (with first flange 176, second flange 178, third flange 148, and fourth flange 150), and the fourth connector 108 (with first flange 162, second flange 164, third flange 136, and fourth flange 138). The gate 400 also includes the first beam 110 (with first end 134 and second end 140), the second beam 112 (with first end 146 and second end 152), and a fence panel 402. In this embodiment, the fence panel 402 further includes a first rail 404 (with a first end 406 and a second end 408), a second rail 410 (with a first end 412 and a second end 414), a third rail 416 (with a first end 418 and a second end 420), and a fourth rail 422 (with a first end 424 and a second end 426). Instead of single rails that extend through the thickness of the entire fence panel (e.g., rails 160, 168, 304, 310), the rails (404, 410, 416, 422) of gate 400 are located on opposite surfaces of the fence panel 402 as shown in FIG. 4A. Based on the structure of the gate 400, the first flange 154 of the first connector 102 is attached to the first end 406 of the first rail 404; the second flange 156 of the first connector 102 is attached to the first end 418 of the third rail 416; the first flange 162 of the fourth connector 108 is attached to the first end 424 of the fourth rail 422; the second flange 164 of the fourth connector 108 is attached to the first end 412 of the second rail 410; the first flange 170 of the second connector 104 is attached to the second end 420 of the third rail 416; the second flange 172 of the second connector 104 is attached to the second end 408 of the first rail 404; the first flange 176 of the third connector 106 is attached to the second end 414 of the second rail 410; and the second flange 178 of the third connector 106 is attached to the second end 426 of the fourth rail 422.

Figure 4C:
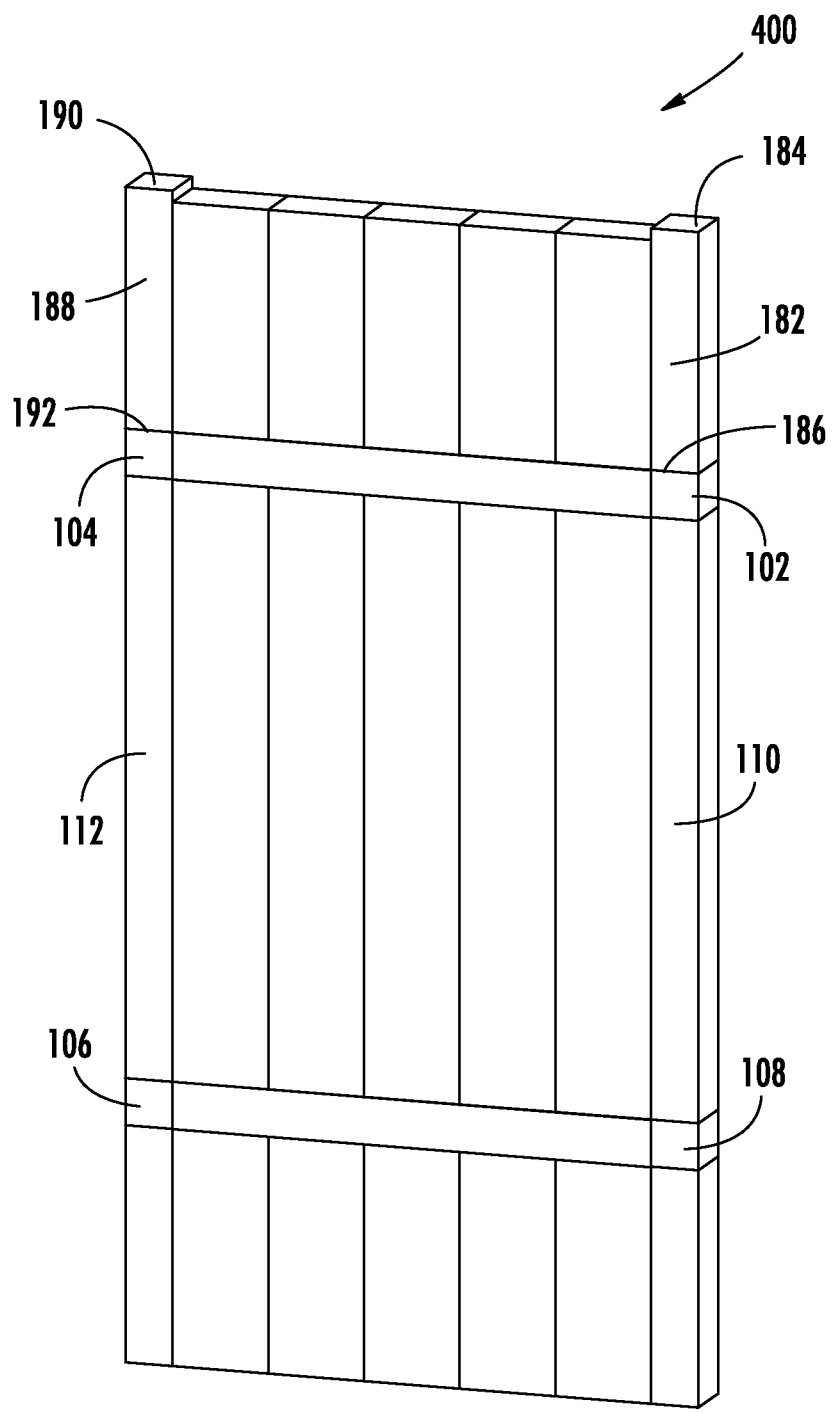
FIG. 4C shows a perspective view of a fence gate that includes a third beam and a fourth beam.
Figure 5A:
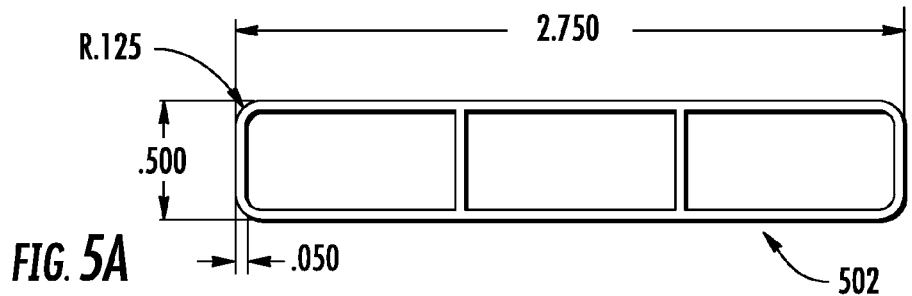
FIG. 5A shows an end view showing the profile of a rail for a fence panel.
Figure 5B:
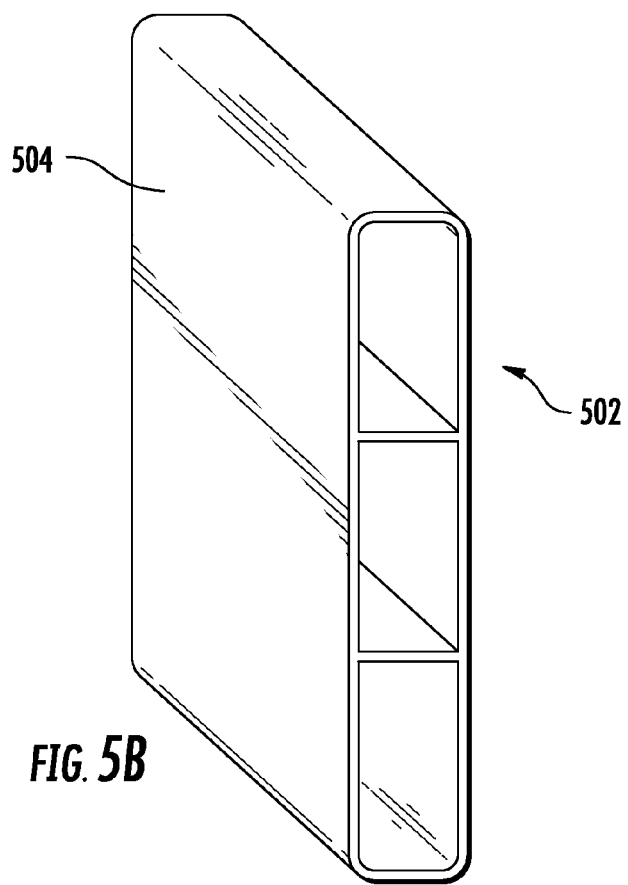
FIG. 5B shows a perspective view of a rail for a fence panel.
Figure 5C:
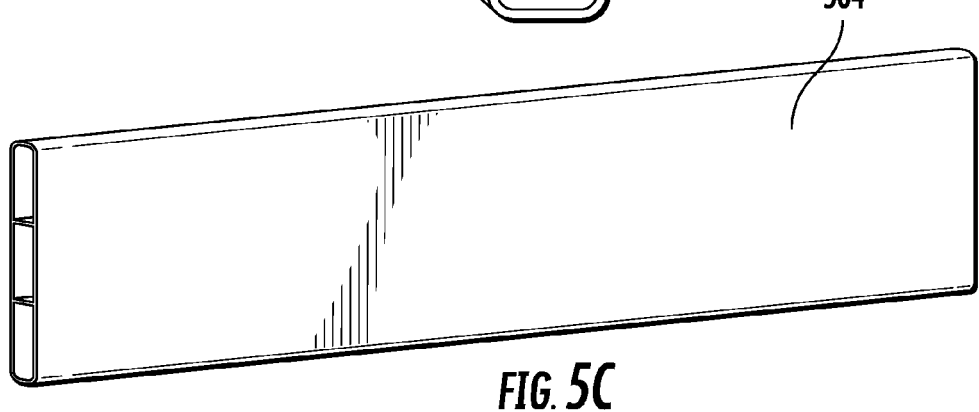
FIG. 5C shows a perspective side view of a rail for a fence panel.

In a related embodiment shown in FIG. 4C, the gate 400 further includes the third beams 182 and the fourth beams 188. In this embodiment, the third beams 182 are attached to the extensions 194 of the first and second connectors 102 and 104, and the fourth beams 188 are attached to the extensions 196 of the third and fourth connectors 106 and 108.

In the various embodiments of gates (200, 300, 400) described above, the various parts of the gates are preferably attached together by an adhesive. The parts of the gates (200, 300, 400) are preferably made primarily of PVC. A preferred adhesive used to hold the parts of the gates (200, 300, 400) together is PVC cement.

Another embodiment of the invention described herein provides a method 600 for assembling a fence gate. One preferred embodiment of the method, shown in FIG. 12A, includes the steps of: (602) attaching the third flange 130 of the first connector 102 and the fourth flange 132 of the first connector 102 to the first end 134 of the first beam 110; (604) attaching the third flange 136 of the fourth connector 108 and the fourth flange 138 of the fourth connector 108 to the second end 140 of the first beam 110; (606) attaching the third flange 142 of the second connector 104 and the fourth flange 144 of the second connector 104 to the first end 146 of the second beam 112; (608) attaching the third flange 148 of the third connector 106 and the fourth flange 150 of the third connector 106 to the second end 152 of the second beam 112; (610) attaching the first flange 154 of the first connector 102 and the second flange 156 of the first connector 102 to the first end 158 of the first rail 160 of fence panel 128; (612) attaching the first flange 162 of the fourth connector 108 and the second flange 164 of the fourth connector 108 to the first end 166 of the second rail 168 of fence panel 128; (614) attaching the first flange 170 of the second connector 104 and the second flange 172 of the second connector 104 to the second end 174 of the first rail 160 of fence panel 128; and (616) attaching the first flange 176 of the third connector 106 and the second flange 178 of the third connector 106 to the second end 180 of the second rail 168 of fence panel 128. All of the attaching steps listed above are preferably accomplished by gluing (i.e., the use of an adhesive). In an exemplary embodiment, the steps of gluing the flanges (130, 132, 136, 138, 142, 144, 148, 150) to the beams (110, 112) are preferably accomplished by, for example, applying adhesive material to the outward facing surface 151 of the third flange 142 of the second connector 104 and outward facing surface 153 of the fourth flange 144 of the second connector 104 prior to inserting the flanges (142, 144) into the first end 134 of the first beam 110. Similarly, the steps of gluing the flanges (154, 156, 162, 164, 170, 172, 176, 178) to the rails (160, 168, 304, 312, 404, 410, 416, 422) are preferably accomplished by, for example, applying adhesive material to the outward facing surface 155 of the first flange 154 of the first connector 102 and the outward facing surface 157 of the second flange 156 of the first connector 102 prior to inserting the flanges (154, 156) into the first end 158 of the first rail 160.

In a related embodiment shown in FIG. 12B, the method 600 described above further includes the step of (601) adjusting the size of the fence panel. Yet another related embodiment shown in FIG. 12C includes the steps of (601A) adjusting the size of the fence panel, (601B) adjusting the length of the first beam, and (601C) adjusting the length of the second beam.

In another embodiment shown in FIG. 12D, the method 600 includes the additional steps of: (618) attaching the extensions 194 to the third beams 182; and (620) attaching the extensions 196 to the fourth beams 188. In a related embodiment shown in FIG. 12E, this method further includes the step of (617A) adjusting the lengths of the third beams 182 and (617B) adjusting the lengths of the fourth beams 188.

In the various method embodiments listed above, all of the attaching steps are preferably accomplished by gluing (i.e., the use of an adhesive). All of the adjusting steps listed above are preferably accomplished by cutting. There are a number of cutting techniques and cutting machinery used for cutting various materials including PVC, all of which are known to a person having ordinary skill in the art. Therefore, such cutting machinery and cutting techniques are not discussed in detail here. Additionally, other means of adjusting known to a person having ordinary skill in the art may be used other than cutting.

Figure 13A:
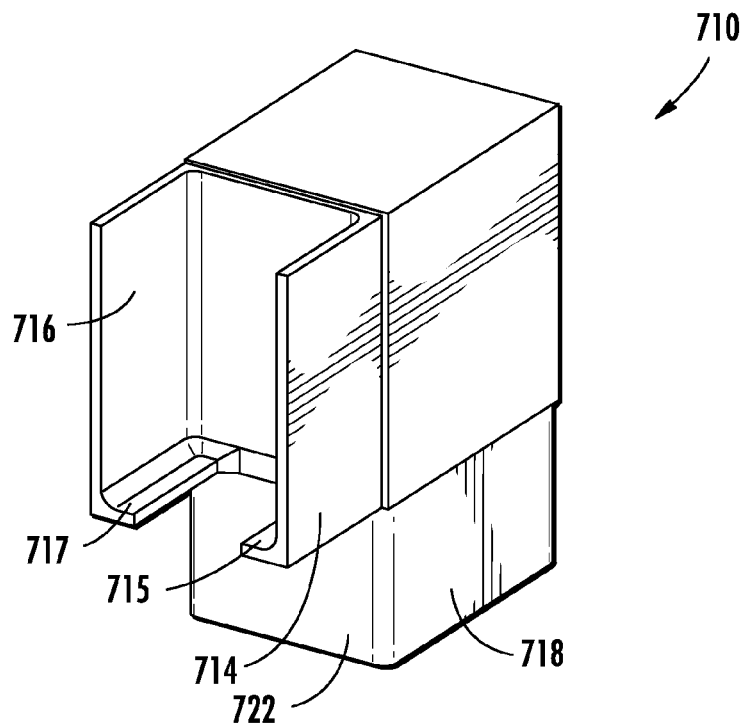
FIG. 13A shows a perspective view of a connector for a fence gate.
Figure 13B:
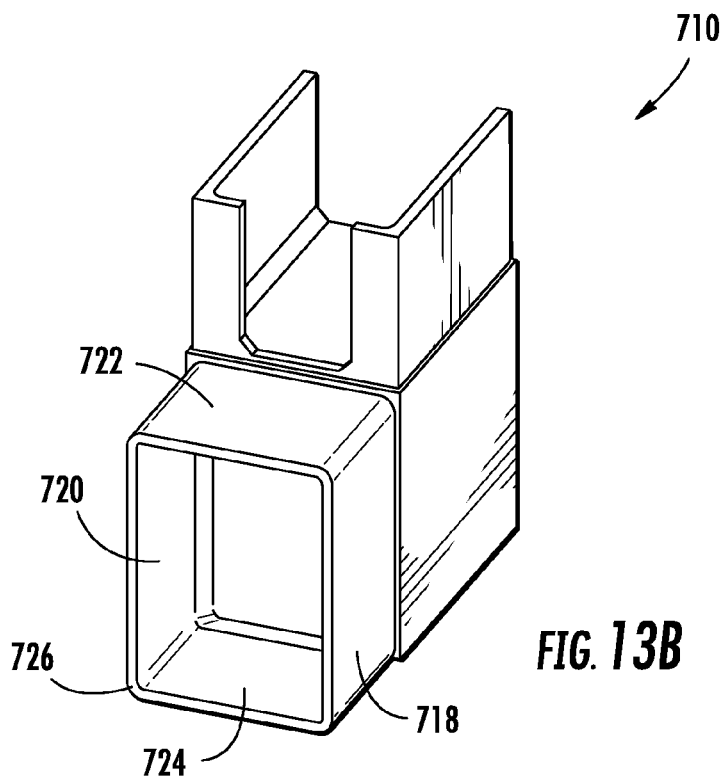
FIG. 13B shows a perspective view of a connector for a fence gate.

An alternate embodiment of a connector 710 is shown in FIGS. 13A and 13B. The connector 710 differs from other embodiments described herein (e.g., connector 10 and connector 11) at least in part because it includes a first flange 714 and a second flange 716 that are less flexible than first flange 14 and second flange 16. Also, flange 714 and flange 716 preferably have a shorter length than previously discussed flanges (14, 16, 22, 24, 25, 27). The first flange 714 includes a base flange 715 that extends substantially toward the second flange 716, and the second flange includes a base flange 717 that extends substantially toward the first flange 718. Another difference between prior embodiments of connectors (10, 11) and connector 710 is that a third flange 718 and a fourth flange 720 are attached together by a first cross flange 722 and a second cross flange 724, thereby forming a receptacle 726. Connector 710 is designed so that an end of a rail may be attached to the connector 710 by placing the end of the rail substantially between the first flange 714 and the second flange 716. Preferably, the end of such rail would sit on one or both of the base flanges (715, 717). There are no opposing flanges across from the base flanges (715, 717) so that substantially any type of rail cross section described herein (FIGS. 5-10) may be attached to connector 710. The attachment of an end of a rail to the connector 710 is preferably accomplished by inserting one or more screws through the first flange 714, a rail to be attached, and the second flange 716. Although screws are preferred, any type or manner of attaching such structures together known to a person having ordinary skill in the art is contemplated.

The connector 710 is also structured so that an end of a beam may be inserted into the receptacle 726 and attached to the connector 710. A beam may be attached to connector 710 by, for example, inserting one or more screws through the third flange 718, the beam to be attached, and the fourth flange 720. Although screws are preferred, any type or manner of attaching such structures together known to a person having ordinary skill in the art is contemplated.

Figure 14:
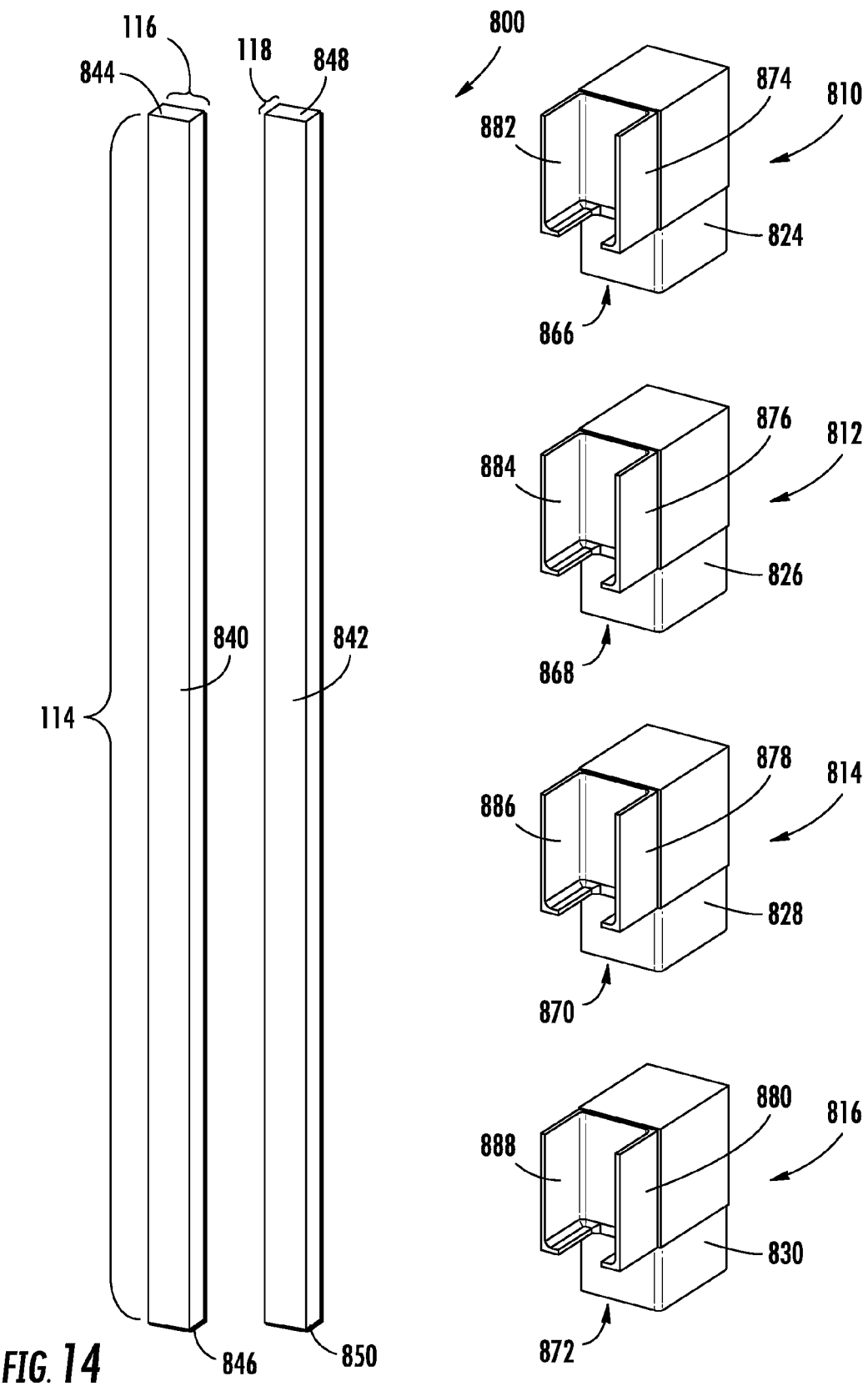
FIG. 14 shows a kit of parts for assembling a fence gate including the connector shown in FIG. 13A and FIG. 13B.

An embodiment of a kit 800 including a connector 710 is shown in FIG. 14. The kit preferably includes two elongate beams (840, 842) and four connectors 710, including a first connector 810, a second connector 812, a third connector 814, and a fourth connector 816. In addition, the kit 800 may also include other additional components as described with regard to kit 100. One such additional component is fence panel 818 that further includes first rail 820 and second rail 822.

Figure 15:
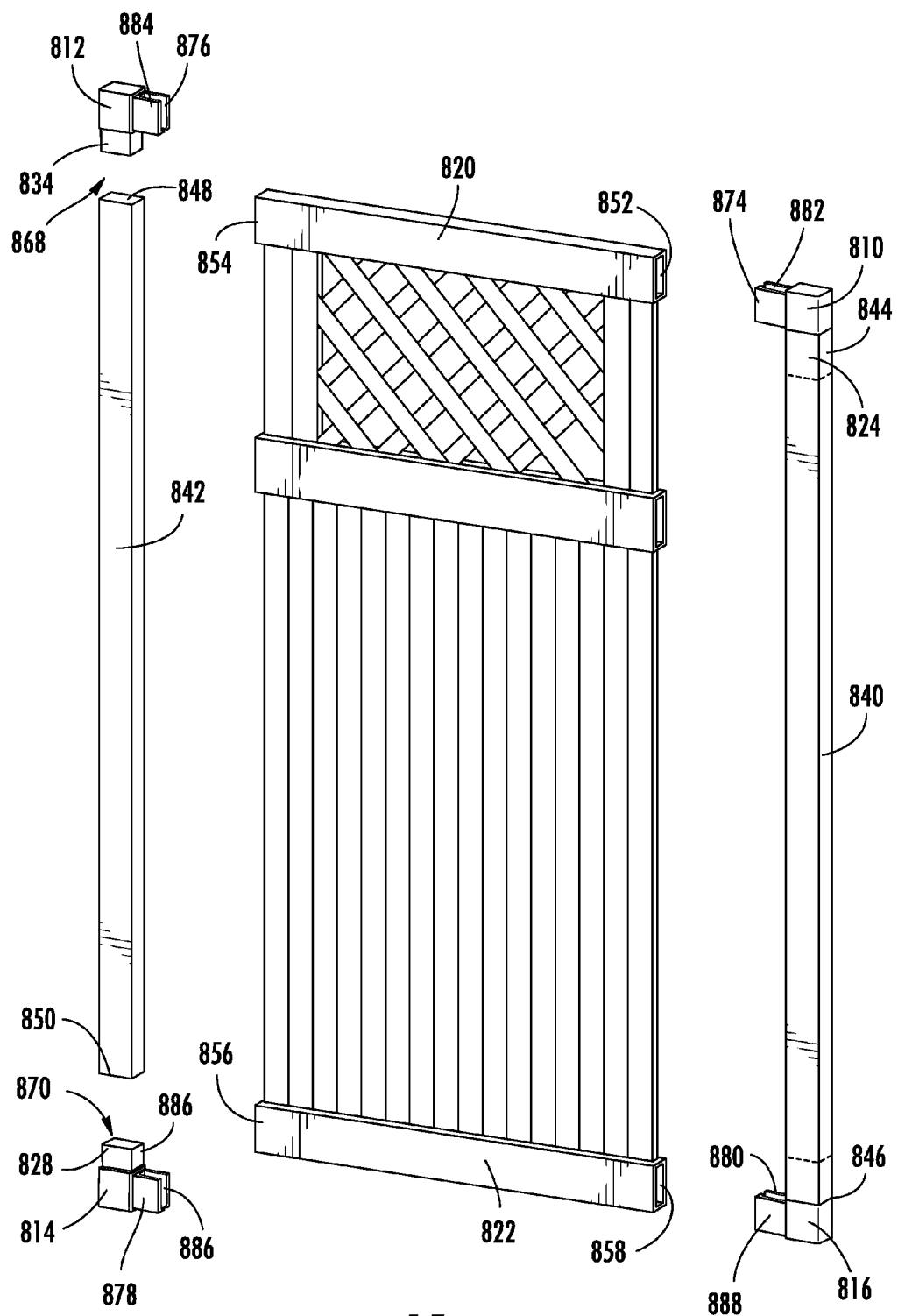
FIG. 15 shows a partially exploded view of a fence gate made using the connector shown in FIG. 13A and FIG. 13B.

A method for assembling a fence gate using the connector 710 as shown in FIG. 15 includes the steps of attaching a first end 844 of the first beam 840 to a receptacle 866 formed between the third flange 824 and the fourth flange 832 of the first connector 810. The method includes a similar step of attaching a second end 846 of the first beam to a receptacle 872 formed between the third flange 830 and the fourth flange 838 of the fourth connector 816. The method includes similar steps of attaching the first end 848 of the second beam 842 to a receptacle 868 formed between the third flange 826 and the fourth flange 834 of the second connector 812, and attaching the second end 850 of the second beam 842 to a receptacle 870 formed between the third flange 828 and the fourth flange 836 of the third connector 814. The method includes another step of positioning the first flange 874 and the second flange 882 of the first connector 810 outside of the first end 852 of the first rail 820 of the fence panel and attaching the first connector 810 to the first rail 820 preferably by passing a fastener through the first flange 874, the first end 820, and the second flange 882. The second connector 812 may be attached to the second end 854 of the first rail 820 in the same manner. Also, the third connector 814 and the fourth connector 816 may be attached to the respective ends (856, 858) of the second rail 822 in a similar manner. The steps of attaching may be accomplished by using, for example, bolts, screws, or nails. Although bolts, screws, and nails are specifically mentioned here, any securing fasteners known to a person having ordinary skill in the art are contemplated. In a related embodiment, the method further includes the step of adjusting the size of the fence panel 818. In another related embodiment, the method includes the steps of adjusting the length of the first beam 840 and adjusting the length of the second beam 842, by, for example, cutting the beams (840, 842).

Figure 16A:
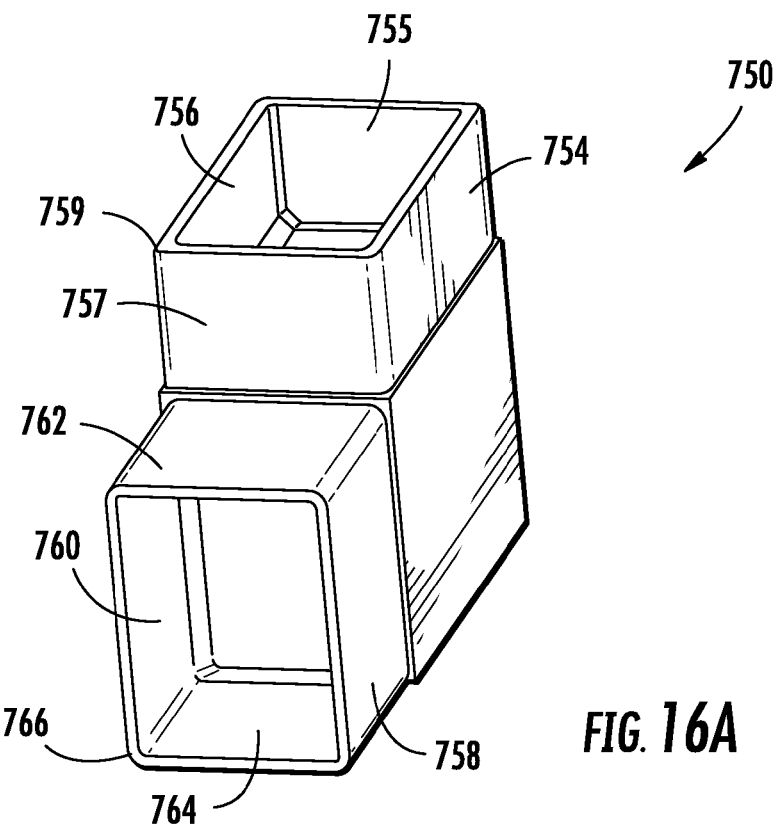
FIG. 16A shows a perspective view of a connector for a fence gate.
Figure 16B:
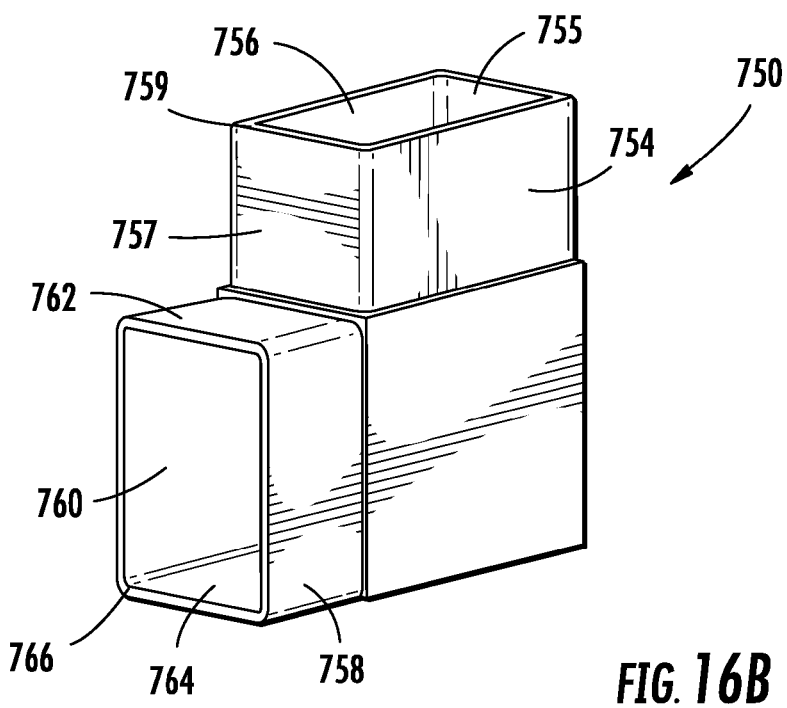
FIG. 16B shows a perspective view of a connector for a fence gate.

An alternate embodiment of a connector 750 is shown in FIGS. 16A and 16B. The connector 750 differs from connector 710 at least in part because a first flange 754 and a second flange 756 are attached together by a third cross flange 755 and a fourth cross flange 757, thereby forming a receptacle 759 for engagement with the end of a rail. In similar fashion to connector 710, however, a third flange 758 and a fourth flange 760 are attached together by a first cross flange 762 and a second cross flange 764, thereby forming a receptacle 766 for engagement with an end of a beam.

Figure 17:
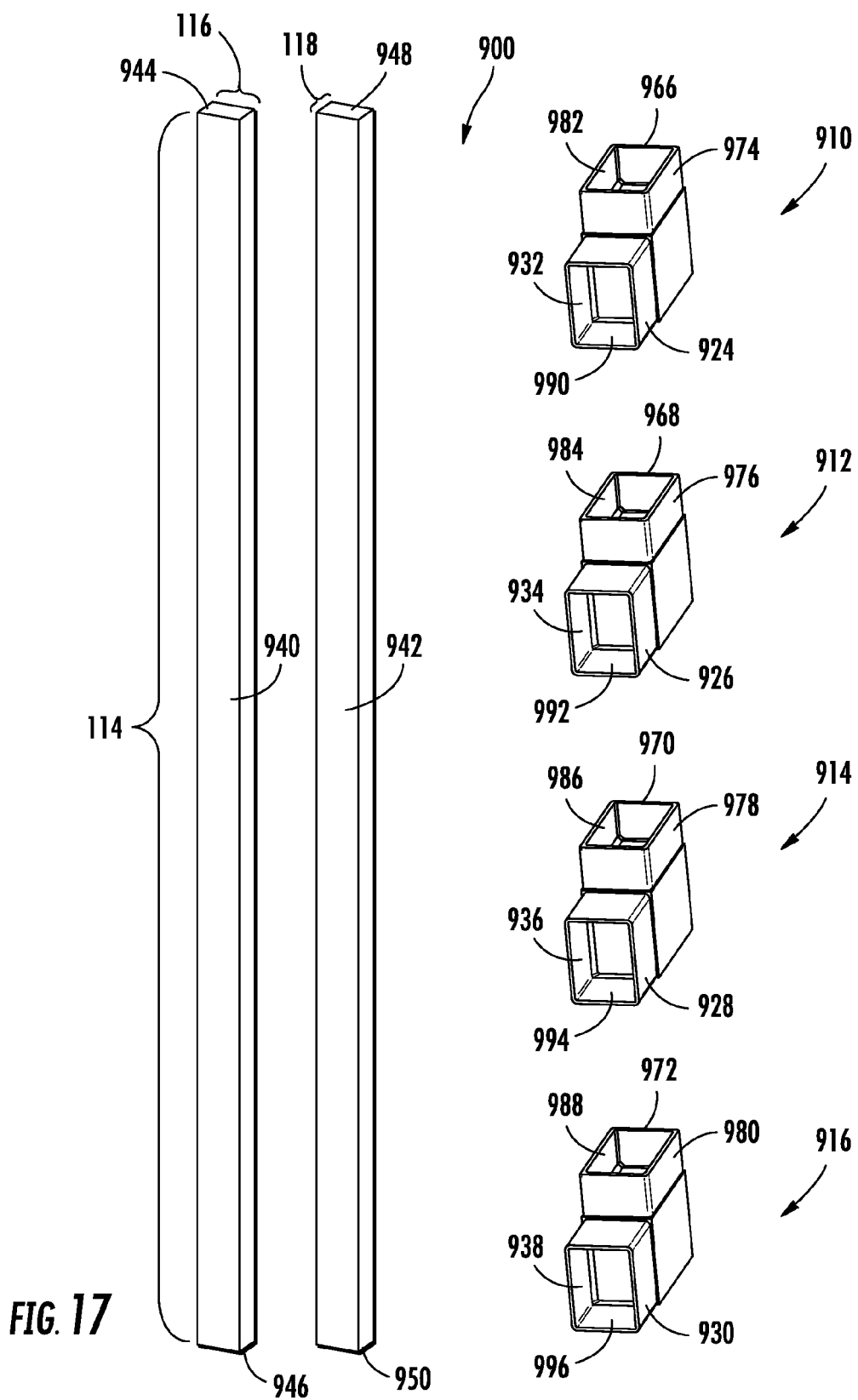
FIG. 17 shows a kit of parts for assembling a fence gate including the connector shown in FIG. 16A and FIG. 16B.

An embodiment of a kit 900 including a connector 750 is shown in FIG. 17. The kit preferably includes two elongate beams (940, 942) and four connectors 750, including a first connector 910, a second connector 912, a third connector 914, and a fourth connector 916. In addition, the kit 900 may also include other additional components as described with regard to kit 100 and kit 800. One such additional component is fence panel 918 that further includes first rail 920 and second rail 922

Figure 18:
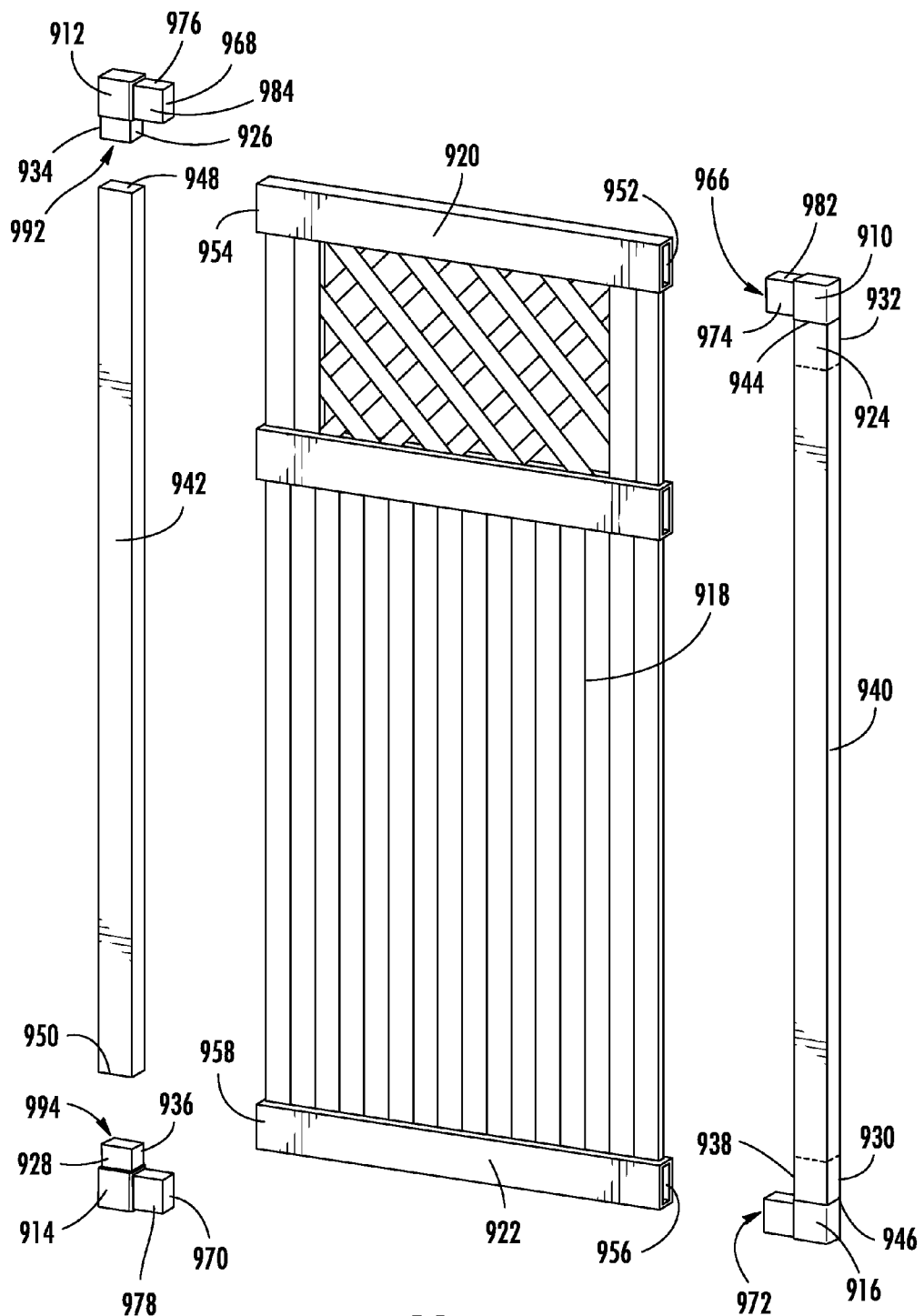
FIG. 18 shows a partially exploded view of a fence gate made using the connector shown in FIG. 16A and FIG. 16B.

A method for assembling a fence gate using the connector 750 as shown in FIG. 18 includes the steps of attaching the third flanges (924, 926, 928, 930) and the fourth flanges (932, 934, 936, 938) of the connectors (910, 912, 914, 916) to beams (940, 942). More specifically, the method includes the step of attaching a first end 944 of the first beam 940 to a receptacle 990 of the connector 910 by inserting the first end 944 into the receptacle 990 and passing a fastener through the third flange 924, the first end 944, and the fourth flange 932 of the first connector 910. The second connector 912 may be attached to the second end 946 of the first beam 940 in the same manner. Also, the third connector 914 and the fourth connector 916 may be attached to the respective ends (948, 950) of the second beam 942 in a similar manner. Another step includes attaching a first end 952 of the first rail 920 of the fence panel 918 to a receptacle 966 of the connector 910 by inserting the first end 952 into the receptacle 966 and passing a fastener through a first flange 974 of the first connector 910, the first end 952, and a second flange 982 of the first connector 910. The second connector 912 may be attached to the second end 954 of the first rail 920 in the same manner. Also, the third connector 914 and the fourth connector 916 may be attached to the respective ends (956, 958) of the second rail 922 in a similar manner. The steps of attaching may be accomplished by using, for example, bolts, screws, or nails. Although bolts, screws, and nails are specifically mentioned here, any securing fasteners known to a person having ordinary skill in the art are contemplated. In a related embodiment, the method further includes the step of adjusting the size of the fence panel 918. In another related embodiment, the method includes the steps of adjusting the length of the first beam 940 and adjusting the length of the second beam 942, by, for example, cutting the beams (940, 942).

In addition to kit 800 and kit 900, the invention also includes embodiments of fence gates constructed using the parts of kit 800 and kit 900 using the respective method steps described above.

The foregoing description of preferred embodiments for this invention has been presented for the purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of assembling a fence gate using a fence gate kit the fence gate kit comprising:
    a first connector, a second connector, a third connector and a fourth connector, each of the first, second, third and fourth connectors comprising:
        a body;
        a flexible flared first flange extending substantially orthogonal to the body;
        a flexible flared second flange extending substantially orthogonal to the body and at an angle of approximately 90° relative to the first flange;
    a first elongate beam and a second elongate beam, the first elongate beam and second elongate beam comprising opposing first and second open ends and an inner surface;
    a first elongate rail and a second elongate rail, the first elongate rail and second elongate rail comprising opposing first and second open ends and an inner surface; and
    a fence panel secured between the first elongate rail and the second elongate rail;
    a fifth connector and a sixth connector, the fifth and sixth connectors comprising
        a body;
        a flexible flared first flange extending substantially orthogonal to the body;
        a flexible flared second flange extending substantially orthogonal to the body and at an angle of approximately 90° relative to the first flange;
    an extension extending from the body of each of the first, second, third, fourth, fifth and sixth connectors substantially opposite from the first flange;
    a third elongate beam and a fourth elongate beam, the third and fourth elongate beams further comprising opposing first and second open ends and an inner surface; and
    a third elongate rail, the third elongate rail further comprising opposing first and second open ends and an inner surface;
the method of assembling the fence gate further comprising:
    inserting the first flange of the first connector and second connector into the opposing first and second open ends of the first elongate beam such that the flexible flared first flange engages the inner surface of and is concealed within the first elongate beam;

inserting the first flange of the third connector and fourth connector into the opposing first and second open ends of the second elongate beam such that the flexible flared first flange engages the inner surface of and is concealed within the second elongate beam;

inserting the second flange of the first connector and second connector into the opposing first and second open ends of the first elongate rail such that the flexible flared second flange engages the inner surface of and is concealed within the first elongate rail; and inserting the second flange of the third and fourth connector into the opposing first and second open ends of the second elongate rail such that the flexible flared second flange engages the inner surface of and is concealed within the second elongate rail;

inserting the extension of the third connector and fourth connector into the first open end of the third elongate beam and fourth elongate beam such that the extension engages the inner surface of and is concealed within the third elongate beam;

inserting the flexible flared first flange of the fifth connector and sixth connector into the second open end of the third elongate beam and fourth elongate beam such that the flexible flared first flange engages the inner surface of and is concealed within the third elongate beam;

inserting the flexible flared second flange of the fifth connector into the first open end of the third elongate rail such that the flexible flared second flange engages the inner surface of and is concealed within the third elongate rail; and inserting the flexible flared second flange of the sixth connector into the second open end of the third elongate rail such that the flexible flared second flange engages the inner surface of and is concealed within the third elongate rail.

2. The method of claim 1 further comprising the step of adjusting the size of the fence gate.

3. The method of claim 1 further comprising the steps of adjusting a length of the first elongate beam and adjusting a length of the second elongate beam.

\* \* \* \* \*